United States Patent
Cattron et al.

(10) Patent No.: US 8,734,945 B2
(45) Date of Patent: *May 27, 2014

(54) D1364 BT SECONDARY COATINGS ON OPTICAL FIBER

(71) Applicant: DSM IP Assets B.V., Heerlen (NL)

(72) Inventors: Wendell Wayne Cattron, Iron Station, NC (US); Steven Robert Schmid, East Dundee, IL (US); Edward Joseph Murphy, Arlington Heights, IL (US); John Monroe Zimmerman, Crystal Lake, IL (US); Anthony Joseph Tortorello, Elmhurst, IL (US)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,017

(22) Filed: Apr. 22, 2013

(65) Prior Publication Data
US 2013/0237643 A1 Sep. 12, 2013

Related U.S. Application Data

(63) Continuation of application No. 13/233,670, filed on Sep. 15, 2011, now Pat. No. 8,426,021, which is a continuation of application No. 11/955,838, filed on Dec. 13, 2007, now abandoned.

(60) Provisional application No. 60/874,723, filed on Dec. 14, 2006, provisional application No. 60/874,720, filed on Dec. 14, 2006, provisional application No. 60/874,730, filed on Dec. 14, 2006.

(51) Int. Cl.
| B32B 9/00 | (2006.01) |
| D02G 3/00 | (2006.01) |
| C08F 283/10 | (2006.01) |
| C08F 20/22 | (2006.01) |

(52) U.S. Cl.
USPC .............. 428/392; 428/378; 522/92; 522/182

(58) Field of Classification Search
CPC ....... C09D 163/00; C09D 175/14; G02B 1/10
See application file for complete search history.

(56) References Cited

U.S. PATENT DOCUMENTS

| 4,707,076 A | 11/1987 | Skutnik et al. |
| 4,720,529 A | 1/1988 | Kimura et al. |
| 4,849,462 A | 7/1989 | Bishop |
| 4,875,758 A | 10/1989 | Masuda et al. |
| 4,900,126 A | 2/1990 | Jackson et al. |
| 4,904,051 A | 2/1990 | Broer et al. |
| 4,962,992 A | 10/1990 | Chapin et al. |
| 5,104,433 A | 4/1992 | Chapin et al. |
| 5,146,531 A | 9/1992 | Shustack |
| 5,182,784 A | 1/1993 | Hager et al. |
| 5,219,896 A | 6/1993 | Coady et al. |
| 5,268,984 A | 12/1993 | Hosoya et al. |
| 5,352,712 A | 10/1994 | Shustack |
| 5,366,527 A | 11/1994 | Amos et al. |
| 5,408,564 A | 4/1995 | Mills |
| 5,416,880 A | 5/1995 | Edwards et al. |
| 5,536,529 A | 7/1996 | Shustack |
| 5,554,785 A | 9/1996 | Trapasso et al. |
| 5,616,630 A | 4/1997 | Heinze |
| 5,639,846 A | 6/1997 | Shustack |
| 5,664,041 A | 9/1997 | Szum |
| 5,696,179 A | 12/1997 | Chawla |
| 5,847,021 A | 12/1998 | Tortorello et al. |
| 5,881,194 A | 3/1999 | Duecker |
| 5,908,874 A | 6/1999 | Fong et al. |
| 6,014,488 A | 1/2000 | Shustack |
| 6,023,547 A | 2/2000 | Tortorello |
| 6,042,943 A | 3/2000 | Levy |
| 6,057,034 A | 5/2000 | Yamazaki et al. |
| 6,110,593 A | 8/2000 | Szum et al. |
| 6,122,428 A | 9/2000 | Duecker |
| 6,130,980 A | 10/2000 | Murphy et al. |
| 6,173,102 B1 | 1/2001 | Suzuki et al. |
| 6,187,835 B1 | 2/2001 | Szum et al. |
| 6,197,422 B1 | 3/2001 | Murphy et al. |
| 6,298,189 B1 | 10/2001 | Szum et al. |
| 6,323,255 B1 | 11/2001 | Snowwhite et al. |
| 6,339,666 B2 | 1/2002 | Szum et al. |
| 6,355,599 B1 | 3/2002 | Zahora et al. |

(Continued)

FOREIGN PATENT DOCUMENTS

| CN | 1409734 A | 4/2003 |
| CN | 1200053 C | 5/2005 |

(Continued)

OTHER PUBLICATIONS

Office Action in related U.S. Appl. No. 11/955,628; Notification Date: May 23, 2013.
Office Action in related U.S. Appl. No. 11/955,525; Notification Date: Jun. 5, 2013.
Office Action in related U.S. Appl. No. 11/955,614; Notification Date: May 22, 2013.
Office Action in related U.S. Appl. No. 11/955,604; Notification Date: Jun. 4, 2013.
Office Action in related U.S. Appl. No. 11/955,547; Notification Date: May 23, 2013.
Office Action in related U.S. Appl. No. 11/955,721; Notification Date: Jun. 4, 2013.
Office Action in related U.S. Appl. No. 11/955,838; Notification Date: Jun. 4, 2013.

(Continued)

Primary Examiner — Jennifer Chriss
Assistant Examiner — Ricardo E Lopez
(74) Attorney, Agent, or Firm — Nixon & Vanderhye P.C.

(57) ABSTRACT

The invention relates to a Radiation Curable Secondary Coating composition for use on an Optical Fiber. The Radiation Curable Secondary Coating composition is a urethane-free Alpha Oligomer prepared by reaction of the following: (a) an acrylate compound selected from an alcohol-containing acrylate or alcohol-containing methacrylate compound, (b) an anhydride compound, (c) an epoxy-containing compound, (d) optionally an extender compound, and (e) optionally a catalyst. The invention also relates to a coated wire and to a coated optical fiber.

1 Claim, No Drawings

(56) References Cited

U.S. PATENT DOCUMENTS

| | | |
|---|---|---|
| 6,438,306 B1 | 8/2002 | Bishop et al. |
| 6,534,618 B1 | 3/2003 | Jacobs et al. |
| 6,584,263 B2 | 6/2003 | Fewkes et al. |
| 6,630,242 B1 | 10/2003 | Lin et al. |
| 6,638,616 B2 | 10/2003 | Tortorello et al. |
| 6,707,977 B2 | 3/2004 | Chien et al. |
| 6,714,712 B2 | 3/2004 | Bishop et al. |
| 6,775,451 B1 | 8/2004 | Botelho et al. |
| 6,852,770 B2 | 2/2005 | Bishop et al. |
| 6,862,392 B2 | 3/2005 | Fabian et al. |
| 6,961,508 B2 | 11/2005 | van Eekelen et al. |
| 6,961,598 B2 | 11/2005 | Diab |
| 7,064,154 B2 | 6/2006 | Hu et al. |
| 7,122,247 B2 | 10/2006 | Jibing et al. |
| 7,135,229 B2 | 11/2006 | Tortorello et al. |
| 7,171,103 B2 | 1/2007 | Eekelen et al. |
| 7,238,386 B2 | 7/2007 | Workman, II et al. |
| 7,268,172 B2 | 9/2007 | Bach et al. |
| 7,276,543 B2 | 10/2007 | Bishop et al. |
| 8,426,020 B2 | 4/2013 | Schmid et al. |
| 8,426,021 B2 | 4/2013 | Cattron et al. |
| 2001/0025062 A1 | 9/2001 | Szum et al. |
| 2002/0057881 A1 | 5/2002 | Greer, IV |
| 2002/0127400 A1 | 9/2002 | Uchida et al. |
| 2002/0146225 A1 | 10/2002 | Bulters et al. |
| 2002/0151615 A1 | 10/2002 | Tortorello et al. |
| 2002/0168164 A1 | 11/2002 | Bishop et al. |
| 2003/0100627 A1 | 5/2003 | Bishop et al. |
| 2003/0144371 A1 | 7/2003 | Kometani et al. |
| 2004/0024080 A1 | 2/2004 | Jibing et al. |
| 2004/0048946 A1 | 3/2004 | Tortorello et al. |
| 2004/0062501 A1 | 4/2004 | Abel et al. |
| 2004/0086248 A1 | 5/2004 | Wilson et al. |
| 2004/0162385 A1 | 8/2004 | Krebs |
| 2004/0209994 A1 | 10/2004 | Terwillegar |
| 2006/0052571 A1 | 3/2006 | Heischkel et al. |
| 2006/0062539 A1 | 3/2006 | Bulters et al. |
| 2006/0084713 A1 | 4/2006 | Bach et al. |
| 2006/0084756 A1 | 4/2006 | Southwell et al. |
| 2006/0287408 A1 | 12/2006 | Baikerikar et al. |
| 2007/0244270 A1 | 10/2007 | December et al. |

FOREIGN PATENT DOCUMENTS

| | | |
|---|---|---|
| CN | 1651533 A | 8/2005 |
| CN | 1770011 A | 5/2006 |
| DE | 04 12 68 60 A1 | 2/1993 |
| EP | 0 407 004 | 4/1990 |
| EP | 0 539 030 B1 | 4/1993 |
| EP | 0 619 275 B1 | 10/1994 |
| EP | 0 874 012 | 4/1998 |
| EP | 1 408 017 | 4/2004 |
| EP | 1 647 585 | 4/2006 |
| EP | 1 708 017 | 1/2007 |
| EP | 2 091 883 B1 | 8/2009 |
| EP | 1 908 786 B1 | 9/2010 |
| JP | 57-092552 | 6/1982 |
| JP | 61-21180 | 5/1986 |
| JP | 63-161417 A2 | 7/1988 |
| JP | 11-11986 | 4/1989 |
| JP | 7-206977 | 8/1995 |
| JP | 09-258041 A2 | 10/1997 |
| JP | 10-212327 | 8/1998 |
| JP | 11-60991 | 3/1999 |
| JP | 11-92537 | 4/1999 |
| JP | 11-181041 | 7/1999 |
| JP | 11-279240 | 10/1999 |
| JP | 2000-072821 | 3/2000 |
| JP | 2001-226150 | 8/2001 |
| JP | 2001-524223 | 11/2001 |
| JP | 2002-504959 | 2/2002 |
| JP | 2003-506526 | 2/2003 |
| JP | 2003-511531 | 3/2003 |
| JP | 2003-95706 | 4/2003 |
| JP | 2003-96336 | 4/2003 |
| JP | 2003-131090 A2 | 5/2003 |
| JP | 2004-51905 | 2/2004 |
| JP | 2004-051905 | 2/2004 |
| JP | 2004-210879 | 7/2004 |
| JP | 2004-217823 | 8/2004 |
| JP | 2004-530163 | 9/2004 |
| JP | 2004-534132 | 11/2004 |
| JP | 2005-524094 | 8/2005 |
| JP | 2006-117934 | 5/2006 |
| JP | 2006-131911 | 5/2006 |
| JP | 2006-249263 | 9/2006 |
| JP | 3879888 | 11/2006 |
| JP | P2009-536355 | 3/2010 |
| JP | P2009-536357 | 3/2010 |
| JP | P2009-536358 | 3/2010 |
| JP | P2009-536359 | 3/2010 |
| JP | 2010-510332 | 4/2010 |
| KR | 10-2006-0115353 | 11/2006 |
| WO | WO 95/15928 | 6/1995 |
| WO | WO 96/28396 | 9/1996 |
| WO | WO 97/46380 | 12/1997 |
| WO | WO 98/21157 | 5/1998 |
| WO | WO 98/47954 | 10/1998 |
| WO | 98/50317 | 11/1998 |
| WO | 98/57902 | 12/1998 |
| WO | 99/10443 | 3/1999 |
| WO | 00/18696 | 4/2000 |
| WO | 01/27181 | 4/2001 |
| WO | WO 01/47823 | 7/2001 |
| WO | WO 01/49625 | 7/2001 |
| WO | 02/42236 | 5/2002 |
| WO | 02/42236 A2 | 5/2002 |
| WO | WO 02/098945 | 12/2002 |
| WO | 03/091178 A2 | 11/2003 |
| WO | WO 2004/031091 | 4/2004 |
| WO | 2005/026228 | 3/2005 |
| WO | 2005/026228 A1 | 3/2005 |
| WO | 2006/129580 A1 | 12/2006 |
| WO | WO 2008/076285 | 6/2008 |
| WO | WO 2008/076297 | 6/2008 |
| WO | WO 2008/076299 | 6/2008 |
| WO | WO 2008/076300 | 6/2008 |
| WO | WO 2008/076302 | 6/2008 |

OTHER PUBLICATIONS

Office Action in related U.S. Appl. No. 11/955,935; Notification Date: Jun. 3, 2013.
Office Action in related U.S. Appl. No. 11/955,628; Notification Date: Apr. 22, 2013.
Office Action in related U.S. Appl. No. 11/955,525; Notification Date: Mar. 14, 2013.
Office Action in related U.S. Appl. No. 11/955,525; Notification Date: Apr. 19, 2013.
Office Action in related U.S. Appl. No. 11/955,614; Notification Date: Apr. 22, 2013.
Office Action in related U.S. Appl. No. 11/955,604; Notification Date: Mar. 14, 2013.
Office Action in related U.S. Appl. No. 11/955,604; Notification Date: Apr. 19, 2013.
Office Action in related U.S. Appl. No. 11/955,547; Notification Date: Apr. 23, 2013.
Office Action in related U.S. Appl. No. 11/955,721; Notification Date: Mar. 15, 2013.
Office Action in related U.S. Appl. No. 11/955,721; Notification Date: Apr. 19, 2013.
Office Action in related U.S. Appl. No. 11/955,838; Notification Date: Mar. 14, 2013.
Office Action in related U.S. Appl. No. 11/955,838; Notification Date: Apr. 22, 2013.
Office Action in related U.S. Appl. No. 11/955,935; Notification Date: Mar. 14, 2013.
Office Action in related U.S. Appl. No. 11/955,935; Notification Date: Apr. 18, 2013.
Papers issued in corresponding EP application 07 862 848.4 on Mar. 28, 2011 and papers related to prosecution of same; 125 pages.

(56) References Cited

OTHER PUBLICATIONS

P. 240, 241 and 1095 of Kobunshi Daijiten, Maruzen Co., Ltd., published on Sep. 20, 1994; in Japanese with English Translation; 14 pages.
International Search Report for International Application No. PCT/US2007/025427 dated Apr. 22, 2008.
Written Opinion of the International Searching Authority for International Application No. PCT/US2007/025427 dated Apr. 22, 2008.
International Search Report for International Application No. PCT/US2007/025428 dated Apr. 22, 2008.
Written Opinion of the International Searching Authority for International Application No. PCT/US2007/025428, dated Apr. 22, 2008.
International Search Report for International Application No. PCT/US2007/025479 dated Apr. 22, 2008.
Written Opinion of the International Searching Authority for International Application No. PCT/US2007/025479 dated Apr. 22, 2008.
International Search Report for International Application No. PCT/US2007/025480 dated Apr. 22, 2008.
Written Opinion of the International Searching Authority for International Application No. PCT/US2007/025480 dated Apr. 22, 2008.
International Search Report for International Application No. PCT/US2007/025481 dated Apr. 22, 2008.
Written Opinion of the International Searching Authority for International Application No. PCT/US2007/025481 dated Apr. 22, 2008.
International Search Report for International Application No. PCT/US2007/025482 dated Apr. 22, 2008.
Written Opinion of the International Searching Authority for International Application No. PCT/US2007/025482 dated Apr. 22, 2008.
International Search Report for International Application No. PCT/US2007/025485 dated Apr. 22, 2008.
Written Opinion of the International Searching Authority for International Application No. PCT/US2007/025485 dated Apr. 22, 2008.
International Search Report for International Application No. PCT/US2007/025486 dated Apr. 22, 2008.
Written Opinion of the International Searching Authority for International Application No. PCT/US2007/025486 dated Apr. 22, 2008.
W. Podkoscielny et al. Urethane-Acrylate Compositions Cured by UV Radiation as Intermediate Protective Covers of Optical Fibers. Die Angewandte Makromolekulare Chemie (Applied Macromolecular Chemistry and Physics), vol. 242, Nr. 4232, p. 123-138 (1996).
W. Podkoscielny et al. UV-Cured Polyurethane-Acrylic Compositions as Protective Coatings for Optical Waveguides. Translation submitted by J.E. Baker. International Polymer Science and Technology, vol. 21, No. 3, Shrewsbury, Shropshire, GB, p. T/102 to T/108 (1994).
U.S. Appl. No. 11/955,525 (Wu et al.), filed Dec. 13, 2007.
U.S. Appl. No. 11/955,547 (Norlin et al.), filed Dec. 13, 2007.
U.S. Appl. No. 11/955,604 (Cattron et al.), filed Dec. 13, 2007.
U.S. Appl. No. 11/955,614 (Wu et al.), filed Dec. 13, 2007.
U.S. Appl. No. 11/955,628 (Wu et al.), filed Dec. 13, 2007.
U.S. Appl. No. 11/955,721 (Cattron et al.), filed Dec. 13, 2007.
U.S. Appl. No. 11/955,838 (Cattron et al.), filed Dec. 13, 2007.
U.S. Appl. No. 11/955,935 (Steeman et al.), filed Dec. 13, 2007.
W. Podkoscielny and B. Tarasiuk. UV-Cured Polyurethane-Acrylic Compositions as Hard External Layers of Two-Layer Protective Coatings for Optical Fibers, *Polimery*, vol. 41, No. 7-8, pp. 448-455 (1996) (with translation).
M. Koshiba et al. Properties of Ultra-Violet Curable Polyurethane Acrylates, *Journal of Materials Science 17*, pp. 1447-1458 (1982).
D. Gloge. Optical-Fiber Packaging and Its Influence on Fiber Straightness and Loss, *The Bell System Technical Journal*, vol. 54, No. 2 pp. 245-262 (Feb. 1975).
W. B. Gardner. Microbending Loss in Optical Fibers, *The Bell System Technical Journal*, vol. 54, No. 2, pp. 457-465 (Feb. 1975).
T. Yabuta. Structural Analysis of Jacketed Optical Fibers Under Lateral Pressure, *J. Lightwave Tech.*, vol. LT-1, No. 4, pp. 529-535 (1983).
Lee L. Blyler, Jr. and Charles J. Aloisio. Polymer Coatings for Optical Fibers, *Chemtech*, pp. 680-684 (Nov. 1987).
J. Baldauf et al. Relationship of Mechanical Characteristics of Dual Coated Single Mode Optical Fibers and Microbending Loss, *IEICE Trans. Commun.*, vol. E76-B No. 4, pp. 352-357 (Apr. 1993).
K. Kobayashi et al. Study of Microbending Loss in Thin Coated Fibers and Fiber Ribbons, *International Wire & Cable Symposium (IWCS) Proceedings 1993*, pp. 386-392.
Mark D. Soucek and Aaron H. Johnson. New Intramolecular Effect Observed for Polyesters: An Anomeric Effect, *JCT Research*, vol. 1, No. 2, pp. 111-116 (Apr. 2004).
P.A.M. Steeman et al. Mechanical Analysis of the In-Situ Primary Coating Modulus Test for Optical Fibers, Proceedings of the 52nd International Wire & Cable Symposium (IWCS)/Focus, Philadelphia, PA, Paper 41, pp. 246-251 (2003).
Paul Steeman et al. Rheological Properties of Optical Fiber Coating Resins At High Shear Rates, Proceedings of the $53^{rd}$ International Wire & Cable Symposium (IWCS)/Focus, Philadelphia, PA, Nov. 17-20, 2003, pp. 532-536 (2004).
Fabrizio Parodi. Isocyanate-Derived Polymers, in *Comprehensive Polymer Science*, vol. 5, Chapter 23, eds. G. Eastmond, A. Ledwith, S. Russo and P. Sigwalt, Pergamon (Elsevier Sci. Publ.), Oxford, UK, pp. 387-412 (1989).
L. Thiele and R. Becker. Catalytic Mechanisms of Polyurethane Formation, *Advances in Urethane Science and Technology*, vol. 12, pp. 59-85 (1993).
Helene Olivier-Bourbigou and Lionel Magna. Ionic Liquids: Perspectives for Organic and Catalytic Reactions, *Journal of Molecular Catalysis A: Chemical*, 182-183, pp. 419-437 (2002).
Keqi Gan et al. Recent Results From Draw Tower Simulator As a Tool for New Coating Development, DSM Desotech Inc., 16 pages, believed to have been presented at the International Wire and Cable Symposium (Orlando, Florida) in Nov. 2007.
Georges Gelbard. Organic Systhesis by Catalysis With Ion-Exchange Resins, *Ind. Eng. Chem. Res.*, vol. 44, No. 23, pp. 8468-8498 (2005).
Werner J. Blank et al. Catalysis of the Isocyanate-Hydroxyl Reaction by Non-Tin Catalysts, *Progress in Organic Coatings* 35, pp. 19-29 (1998).
T. Ukachi et al. The Effect of Drawing Rate on Mechanical Properties of UV Curable Polyurethane Acrylate Coatings for Optical Fiber, International Wire & Cable Symposium Proceedings 1992, pp. 261-266.
H. Takase et al. The Effect of Curing Temperature on Curing Rate and Mechanical Properties of Polyurethane Acrylate Coatings for Optical Fiber, International Wire & Cable Symposium Proceedings 1994, pp. 72-77.
Junji Yoshizawa et al. Cure Behavior of Optical Fiber Primary Coating on Drawing Tower, International Wire & Cable Symposium Proceedings 1999, pp. 680-686.
Tetsuo Katsuta et al. In-Situ Measurement of Primary Coating Modulus on Optical Fiber by Pull-Out-Modulus Technique, Proceedings of the $49^{th}$ International Wire & Cable Symposium, pp. 460-465 (2000).
Satoshi Kamo et al. The Effect of the Fiber Temperature During Fiber Drawing on the Properties of Primary Coatings, Proceedings of the $55^{th}$ International Wire & Cable Symposium, Nov. 12-15, 2006, pp. 470-474.
Steven R. Schmid and Anthony F. Toussaint. Optical Fiber Coatings, *Specialty Optical Fibers Handbook*, Chapter 4, eds. Alexis Mendez and T.F. Morse, Academic Press (Elsevier), Burlington, Mass., pp. 95-122 (2007).
CasChem, Inc. "Coscat 83" Material Safety Data Sheet—Product Identification, pp. 1-7 (1995).
Florio et al. "Handbook of Coatings Additives" $2^{nd}$ Ed. Marcel Dekker, Inc., pp. 159-162 (2004).
Méndez et al. "Specialty Optical Fibers Handbook" pp. 95-122 (2007).
International Preliminary Report on Patentability for Int'l Appln. No. PCT/US2007/025486 mailed Jun. 16, 2009.
Papers filed in corresponding EP application 07 862 848.4 on Dec. 2, 2010 and papers related to the prosecution of same.
European Search Report for European Application No. 10193539.3 dated Mar. 3, 2011.
Office Action mailed Jul. 27, 2010 issued in U.S. Appl. No. 11/955,541.

(56) References Cited

OTHER PUBLICATIONS

Office Action mailed Feb. 17, 2011 issued in U.S. Appl. No. 11/955,541.
Office Action mailed Sep. 14, 2010 issued in U.S. Appl. No. 11/955,628.
Office Action mailed May 5, 2011 issued in U.S. Appl. No. 11/955,628.
Office Action mailed Aug. 11, 2010 issued in U.S. Appl. No. 11/955,525.
Office Action mailed Mar. 22, 2011 issued in U.S. Appl. No. 11/955,525.
Office Action mailed Sep. 14, 2010 issued in U.S. Appl. No. 11/955,721.
Office Action mailed Mar. 17, 2011 issued in U.S. Appl. No. 11/955,721.
Office Action mailed Aug. 31, 2010 issued in U.S. Appl. No. 11/955,604.
Office Action mailed Mar. 31, 2011 issued in U.S. Appl. No. 11/955,604.
Office Action mailed Sep. 15, 2010 issued in U.S. Appl. No. 11/955,614.
Office Action mailed Mar. 17, 2011 issued in U.S. Appl. No. 11/955,614.
Office Action mailed Sep. 27, 2010 issued in U.S. Appl. No. 11/955,547.
Office Action mailed Apr. 1, 2011 issued in U.S. Appl. No. 11/955,547.
Office Action mailed Sep. 28, 2010 issued in U.S. Appl. No. 11/955,838.
Office Action mailed Mar. 17, 2011 issued in U.S. Appl. No. 11/955,838.
Office Action mailed Sep. 28, 2010 issued in U.S. Appl. No. 11/955,935.
Office Action mailed Mar. 31, 2011 issued in U.S. Appl. No. 11/955,935.
P. 535 of Jitsuyo Plastic Yogo Jiten ("Practical Plastics Glossary"), Revised Third Edition published on Sep. 10, 1989, by Plastics Age Co., Ltd and Translation.
P. 276 of Kagaku Daijiten 9 ("Chemistry Dictionary 9"), Second Impression of First Edition published on Aug. 25, 1962. Kyoritsu Shuppan Co., Ltd and Translation.
Practical encyclopedia of plastics, material series, Industrial Research Center Production Goods Work Station, Encyclopedia Publishing Center, Jan. 22, fourth impression of the first edition, p. 807-811 and Translation. (1998).
Lyondell, Polymeg® 650 Polyol, U.S. Sales Specification, Jul. 1, 2007.
Office Action mailed Nov. 4, 2011 issued in U.S. Appl. No. 11/955,628.
Office Action mailed Oct. 17, 2011 issued in U.S. Appl. No. 11/955,525.
Office Action mailed Nov. 4, 2011 issued in U.S. Appl. No. 11/955,614.
Office Action mailed Nov. 23, 2011 issued in U.S. Appl. No. 11/955,604.
Office Action mailed Oct. 26, 2011 issued in U.S. Appl. No. 11/955,547.
Office Action mailed Oct. 14, 2011 issued in U.S. Appl. No. 11/955,541.
Office Action mailed Nov. 23, 2011 issued in U.S. Appl. No. 11/955,721.
Office Action mailed Nov. 29, 2011 issued in U.S. Appl. No. 11/955,838.
Office Action mailed Nov. 4, 2011 issued in U.S. Appl. No. 11/955,935.
Wicks, Zeno et al., "Organic Coatings: Science and Technology Volume 1: Film Formation, Components, and Appearance," 1992, pp. 198-200.
Ciba-Geigy Corp., Photoinitiators for UV Curing: A Formulator's Guide (1995) 45 pgs.
Office Action in related U.S. Appl. No. 11/955,628; Notification Date: Jun. 28, 2012.
Office Action in related U.S. Appl. No. 11/955,628; Notification Date: Jan. 22, 2013.
Office Action in related U.S. Appl. No. 11/955,525; Notification Date: May 31, 2012.
Office Action in related U.S. Appl. No. 11/955,525; Notification Date: Dec. 31, 2012.
Office Action in related U.S. Appl. No. 11/955,614; Notification Date: Jun. 28, 2012.
Office Action in related U.S. Appl. No. 11/955,614; Notification Date: Jan. 4, 2013.
Office Action in related U.S. Appl. No. 11/955,604; Notification Date: Apr. 26, 2012.
Office Action in related U.S. Appl. No. 11/955,604; Notification Date: Dec. 6, 2012.
Office Action in related U.S. Appl. No. 11/955,547; Notification Date: Jun. 28, 2012.
Office Action in related U.S. Appl. No. 11/955,547; Notification Date: Jan. 4, 2013.
Office Action in related U.S. Appl. No. 11/955,541; Notification Date: May 10, 2012.
Office Action in related U.S. Appl. No. 11/955,721; Notification Date: May 11, 2012.
Office Action in related U.S. Appl. No. 11/955,721; Notification Date: Dec. 11, 2012.
Office Action in related U.S. Appl. No. 11/955,838; Notification Date: May 18, 2012.
Office Action in related U.S. Appl. No. 11/955,838; Notification Date: Dec. 7, 2012.
Office Action in related U.S. Appl. No. 11/955,935; Notification Date: Jun. 28, 2012.
Office Action in related U.S. Appl. No. 11/955,935; Notification Date: Jan. 22, 2013.
Office Action in related U.S. Appl. No. 13/233,670; Notification Date: Apr. 25, 2012.
Office Action in related U.S. Appl. No. 13/233,670; Notification Date: Dec. 31, 2012.

D1364 BT SECONDARY COATINGS ON OPTICAL FIBER

CROSS-REFERENCE TO RELATED APPLICATIONS

This application is a continuation of U.S. patent application Ser. No. 13/233,670, filed Sep. 15, 2011, allowed, which is a continuation of Ser. No. 11/955,838, filed Dec. 13, 2007, pending, which claims priority from U.S. Provisional Patent Application 60/874,723, filed Dec. 14, 2006, U.S. Provisional Patent Application 60/874,720, filed Dec. 14, 2006, and U.S. Provisional Patent Application 60/874,730, filed Dec. 14, 2006, the entire contents of each of which are hereby incorporated by reference in this application.

FIELD OF THE INVENTION

The present invention relates generally to Radiation Curable Secondary Coatings suitable for use on Optical Fibers. More particularly the present invention relates to Optical fiber Secondary Coating compositions that include a urethane-free oligomer, and to optical fibers coated with such secondary compositions.

BACKGROUND OF THE INVENTION

Optical fibers are frequently coated with two or more superposed radiation-curable coatings immediately after the fiber is produced by drawing. The coating which directly contacts the optical fiber is called the "inner Primary Coating" and an overlaying coating is called the "outer Primary Coating." In some references, the inner Primary Coating is also called simply the "Primary Coating" and the outer Primary Coating is called a "Secondary Coating." Inner Primary Coatings are softer than Secondary Coatings.

The relatively soft inner Primary Coating provides resistance to microbending which results in attenuation of the signal transmission capability of the coated optical fiber and is therefore undesirable. Microbends are sharp but microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating diameter decreases the amount of protection provided decreases. The relationship between coatings and protection from lateral stress that leads to microbending is discussed, for example, in D. Gloge, "Optical-fiber packaging and its influence on fiber straightness and loss", *Bell System Technical Journal*, Vol. 54, 2, 245 (1975); W. B. Gardner, "Microbending Loss in Optical Fibers", Bell System Technical Journal, Vol. 54, No. 2, p. 457 (1975); T. Yabuta, "Structural Analysis of Jacketed Optical Fibers Under Lateral Pressure", J. *Lightwave Tech.*, Vol. LT-1, No. 4, p. 529 (1983); L. L. Blyler, "Polymer Coatings for Optical Fibers", *Chemtech*, p. 682 (1987); J. Baldaut, "Relationship of Mechanical Characteristics of Dual Coated Single Mode Optical Fibers and Microbending Loss", *IEICE Trans. Commun.*, Vol. E76-B, No. 4, 352 (1993); and K. Kobayashi, "Study of Microbending Loss in Thin Coated Fibers and Fiber Ribbons", IWCS, 386 (1993). The harder outer Primary Coating, that is, the Secondary Coating, provides resistance to handling forces such as those encountered when the coated fiber is ribboned and/or cabled.

Optical fiber Secondary Coating compositions generally comprise, before cure, a mixture of ethylenically-unsaturated compounds, often consisting of one or more oligomers dissolved or dispersed in liquid ethylenically-unsaturated diluents and photoinitiators. The coating composition is typically applied to the optical fiber in liquid form and then exposed to actinic radiation to effect cure.

In many of these compositions, use is made of a urethane oligomer having reactive termini and a polymer backbone. Further, the compositions generally comprise reactive diluents, photoinitiators to render the compositions UV-curable, and other suitable additives.

Published PCT Patent Application WO 2205/026228 A1, published Sep. 17, 2004, "Curable Liquid Resin Composition", with named inventors Sugimoto, Kamo, Shigemoto, Komiya and Steeman describes and claims a curable liquid resin composition suitable for use as a Secondary Coating on Optical Fiber, comprising: (A) a urethane (meth)acrylate having a structure originating from a polyol and a number average molecular weight of 800 g/mol or more, but less than 6000 g/mol, and (B) a urethane (meth)acrylate having a structure originating from a polyol and a number average molecular weight of 6000 g/mol or more, but less than 20,000 g/mol, wherein the total amount of the component (A) and component (B) is 20-95 wt % of the curable liquid resin composition and the content of the component (B) is 0.1-30 wt % of the total of the component (A) and component (B).

Many materials have been suggested for use as the polymer backbone for the methane oligomer. For example, polyols such as hydrocarbon polyols, polyether polyols, polycarbonate polyols and polyester polyols have been used in urethane oligomers. Polyester polyols are particularly attractive because of their commercial availability, oxidative stability and versatility to tailor the characteristics of the coating by tailoring the backbone. The use of polyester polyols as the backbone polymer in a urethane acrylate oligomer is described, for example, in U.S. Pat. Nos. 5,146,531, 6,023, 547, 6,584,263, 6,707,977, 6,775,451 and 6,862,392, as well as European Patent 539 030 A.

Concern over the cost, use and handling of urethane precursors has lead to the use of urethane-free oligomers in coating compositions. For example, urethane-free polyester acrylate oligomers have been used in radiation-curable coating compositions for optical glass fibers. Japanese Patent 57-092552 (Nitto Electric) discloses an optical glass fiber coating material comprising a polyester di(meth)acrylate where the polyester backbone has an average molecular weight of 300 or more. German Patent Application 04 12 68 60 A1 (Bayer) discloses a matrix material for a three-fiber ribbon consisting of a polyester acrylate oligomer, 2-(N-butyl-carbamyl)ethylacrylate as reactive diluent and 2-hydroxy-2-methyl-1-phenyl-propan-1-one as photoinitiator. Japanese Patent Application No. 10-243227 (Publication No. 2000-072821) discloses a liquid curable resin composition comprising a polyester acrylate oligomer which consists of a polyether diol end-capped with two diacids or anhydrides and terminated with hydroxy ethyl acrylate. U.S. Pat. No. 6,714, 712 B2 discloses a radiation curable coating composition comprising a polyester and/or alkyd (meth)acrylate oligomer comprising a polyacid residue or an anhydride thereof, optionally a reactive diluent, and optionally a photoinitiator. Also, Mark D. Soucek and Aaron H. Johnson disclose the use of hexahydrophthalic acid for hydrolytic resistance in "New Intramolecular Effect Observed for Polyesters: An Anomeric Effect," *JCT Research*, Vol. 1, No. 2, p. 111 (April 2004).

Despite the efforts of the prior art to develop coating compositions comprising urethane-free oligomers, there remains a need for Secondary Coatings which are economical while satisfying the many diverse requirements desired, such as improved curing and enhanced cure speeds, and versatility in application while still achieving the desired physical characteristics of the various coatings employed.

SUMMARY OF THE INVENTION

The first aspect of the instant claimed invention is a Radiation Curable Secondary Coating composition comprising a urethane-free Alpha Oligomer prepared by reaction of the following:
(a) an acrylate compound selected from an alcohol-containing acrylate or alcohol-containing methacrylate compound,
(b) an anhydride compound,
(c) an epoxy-containing compound,
(d) optionally an extender compound, and
(e) optionally a catalyst.

The second aspect of the instant claimed invention is a Radiation Curable Secondary Coating composition comprising a Secondary Coating Oligomer Blend;
wherein said Secondary Coating Oligomer Blend comprises an Alpha Oligomer, a Beta Oligomer, and, optionally, a Gamma Oligomer;
wherein said Alpha Oligomer is urethane-free and is prepared by reaction of:
(a) an acrylate compound selected from an alcohol-containing acrylate or alcohol-containing methacrylate compound,
(b) an anhydride compound,
(c) an epoxy-containing compound,
(d) optionally an extender compound, and
(e) optionally a catalyst;
and wherein said Beta Oligomer is different from said Alpha Oligomer.

The third aspect of the instant claimed invention is a Radiation Curable Secondary Coating composition, wherein said composition comprises a Secondary Coating Oligomer Blend; an antioxidant; a first photoinitiator; a second photoinitiator; and optionally a single slip additive or a blend of slip additives;
wherein said Secondary Coating Oligomer Blend comprises:
α) Alpha Oligomer;
β) Beta Oligomer; and
γ) Gamma Oligomer
wherein said Alpha Oligomer is prepared by the reaction of
α1) an anhydride; and
α2) hydroxyethyl acrylate;
and the reaction product of α1) and α2) is then reacted further with
α3) an epoxy; in the presence of
α4) a first catalyst;
α5) a second catalyst;
α6) a polymerization inhibitor;
wherein said Beta Oligomer is prepared by the reaction of
β1) hydroxyethyl acrylate;
β2) one or more diisocyanates;
β3) a polypropylene glycol with a number average molecular weight of about 1000; and
β4) a catalyst;
wherein the Beta oligomer catalyst is selected from the group consisting of dibutyl tin dilaurate; metal carboxylates, including, but not limited to: organobismuth catalysts such as bismuth neodecanoate, CAS 34364-26-6; zinc neodecanoate, CAS 27253-29-8; zirconium neodecanoate, CAS 39049-04-2; and zinc 2-ethylhexanoate, CAS136-53-8; sulfonic acids, including but not limited to dodecylbenzene sulfonic acid, CAS 27176-87-0; and methane sulfonic acid, CAS 75-75-2; amino or organo-base catalysts, including, but not limited to: 1,2-dimethylimidazole, CAS1739-84-0; and diazabicyclo[2.2.2]octane (DABCO), CAS 280-57-9; and triphenyl phosphine; alkoxides of zirconium and titanium, including, but not limited to zirconium butoxide, (tetrabutyl zirconate) CAS1071-76-7; and titanium butoxide, (tetrabutyl titanate) CAS 5593-70-4; and ionic liquid phosphonium, imidazolium, and pyridinium salts, such as, but not limited to, trihexyl (tetradecyl)phosphonium hexafluorophosphate, CAS No. 374683-44-0; 1-butyl-3-methylimidazolium acetate, CAS No. 284049-75-8; and N-butyl-4-methylpyridinium chloride, CAS No. 125652-55-3; and tetradecyl(trihexyl) phosphonium chloride; and wherein said Gamma Oligomer is an epoxy diacrylate.

The fourth aspect of the instant claimed invention is an optical fiber coated with a Radiation Curable Primary Coating and the Radiation Curable Secondary Coating of the first aspect of the instant claimed invention.

The fifth aspect of the instant claimed invention is an optical fiber coated with a Radiation Curable Primary Coating and the Radiation Curable Secondary Coating of the second aspect of the instant claimed invention.

The sixth aspect of the instant claimed invention is an optical fiber coated with a Radiation Curable Primary Coating and the Radiation Curable Secondary Coating of the third aspect of the instant claimed invention.

The seventh aspect of the instant claimed invention is a process for coating an optical fiber, the process comprising:
a) operating a glass drawing tower to produce a glass optical fiber; and
b) coating said glass optical fiber with a radiation curable Primary Coating composition;
c) optionally contacting said radiation curable Primary Coating composition with radiation to cure the coating;
d) coating said glass optical fiber with the radiation curable Secondary Coating composition of the first aspect of the instant claimed invention;
e) contacting said radiation curable Secondary Coating composition with radiation to cure the coating;

The eighth aspect of the instant claimed invention is a wire coated with a first and second layer, wherein the first layer is a cured radiation curable Primary Coating that is in contact with the outer surface of the wire and the second layer is a cured radiation curable Secondary Coating of the first aspect of the instant claimed invention in contact with the outer surface of the Primary Coating, wherein the cured Secondary Coating on the wire has the following properties after initial cure and after one month aging at 85° C. and 85% relative humidity:

A) a % RAU of from about 80% to about 98%;

B) an in-situ modulus of between about 0.60 GPa and about 1.90 GPa; and

C) a Tube Tg, of from about 50° C. to about 80° C.

The ninth aspect of the instant claimed invention is an optical fiber coated with a first and second layer, wherein the first layer is a cured radiation curable Primary Coating that is in contact with the outer surface of the optical fiber and the second layer is a cured radiation curable Secondary Coating of the first aspect of the instant claimed invention in contact with the outer surface of the Primary Coating, wherein the cured Secondary Coating on the optical fiber has the following properties after initial cure and after one month aging at 85° C. and 85% relative humidity:
A) a % RAU of from about 80% to about 98%;
B) an in-situ modulus of between about 0.60 GPa and about 1.90 GPa; and
C) a Tube Tg, of from about 50° C. to about 80° C.

The tenth aspect of the instant claimed invention is a wire coated with a first and second layer, wherein the first layer is a cured radiation curable Primary Coating that is in contact with the outer surface of the wire and the second layer is a cured radiation curable Secondary Coating of the second aspect of the instant claimed invention in contact with the outer surface of the Primary Coating,
wherein the cured Secondary Coating on the wire has the following properties after initial cure and after one month aging at 85° C. and 85% relative humidity:
A) a % RAU of from about 80% to about 98%;
B) an in-situ modulus of between about 0.60 GPa and about 1.90 GPa; and
C) a Tube Tg, of from about 50° C. to about 80° C.

The eleventh aspect of the instant claimed invention is an optical fiber coated with a first and second layer, wherein the first layer is a cured radiation curable Primary Coating that is in contact with the outer surface of the optical fiber and the second layer is a cured radiation curable Secondary Coating of the second aspect of the instant claimed invention in contact with the outer surface of the Primary Coating,
wherein the cured Secondary Coating on the optical fiber has the following properties after initial cure and after one month aging at 85° C. and 85% relative humidity:
A) a % RAU of from about 80% to about 98%;
B) an in-situ modulus of between about 0.60 GPa and about 1.90 GPa; and
C) a Tube Tg, of from about 50° C. to about 80° C.

The twelfth aspect of the instant claimed invention is a wire coated with a first and second layer, wherein the first layer is a cured radiation curable Primary Coating that is in contact with the outer surface of the wire and the second layer is a cured radiation curable Secondary Coating of the third aspect of the instant claimed invention in contact with the outer surface of the Primary Coating,
wherein the cured Secondary Coating on the wire has the following properties after initial cure and after one month aging at 85° C. and 85% relative humidity:
A) a % RAU of from about 80% to about 98%;
B) an in-situ modulus of between about 0.60 GPa and about 1.90 GPa; and
C) a Tube Tg, of from about 50° C. to about 80° C.

The thirteenth aspect of the instant claimed invention is an optical fiber coated with a first and second layer, wherein the first layer is a cured radiation curable Primary Coating that is in contact with the outer surface of the optical fiber and the second layer is a cured radiation curable Secondary Coating of the third aspect of the instant claimed invention in contact with the outer surface of the Primary Coating,
wherein the cured Secondary Coating on the optical fiber has the following properties after initial cure and after one month aging at 85° C. and 85% relative humidity:
A) a % RAU of from about 80% to about 98%;
B) an in-situ modulus of between about 0.60 GPa and about 1.90 GPa; and
C) a Tube Tg, of from about 50° C. to about 80° C.

DETAILED DESCRIPTION OF THE INVENTION

Throughout this patent application the following terms have the indicated meanings:

| Abbreviation | Meaning |
| --- | --- |
| BHT | 2,6-di-tert-butyl-4-methylphenol, available from Fitz Chem. |
| CN-120Z | epoxy diacrylate, available from Sartomer. |
| DABCO | 1,4-diazabicyclo[2.2.2]octane, available from Air Products. |
| DBTDL | dibutyl tin dilaurate, available from OMG Americas. |
| HEA | hydroxyethyl acrylate, available from BASF |
| HHPA | hexahydrophthalic anhydride, available from Milliken Chemical. |
| Irgacure 184 | 1-hydroxycyclohexyl phenyl ketone, available from Ciba Geigy |
| Irganox 1035 | thiodiethylene bis (3,5-di-tert-butyl-4-hydroxyhydrocinnamate), available from Ciba Geigy. |
| SR-506 | isobornyl Acrylate, available as from Sartomer. |
| Photomer 4066 | ethoxylated nonylphenol acrylate, available from Cognis. |
| Pluracol 1010 | polypropylene glycol (MW = 1000), available from BASF; |
| SR-306HP | tripropylene glycol diacrylate (TPGDA), available from Sartomer. |
| SR-349 | ethoxylated bisphenol A diacrylate, available from Sartomer. |
| TDI | An 80/20 blend of the 2,4- and 2,6-isomer of toluene diisocyanate, available from BASF |
| IPDI | Isophorone diisocyanate, available from Bayer |
| TPO | 2,4,6-trimethylbenzoyldiphenylphosphine oxide type photoinitiator, available from Chitech. |

CAS means Chemical Abstracts Registry Number

Optical fiber coatings are typically radiation-curable compositions that include, prior to cure, one or more radiation-curable oligomers or monomers having at least one functional group capable of polymerization when exposed to actinic radiation. The present invention provides an improved radiation-curable oligomer (the Alpha Oligomer) that is urethane-free and derived from an anhydride which is useful in a Secondary Coating composition for optical fiber.

In addition to the Alpha Oligomer, the optical fiber Secondary Coating composition of the invention preferably includes one or more additional oligomers (e.g., a Beta Oligomer and optionally a Gamma Oligomer) and at least one reactive diluent which has at least one functional group capable of polymerization when exposed to actinic radiation. The optical fiber Secondary Coating compositions of the invention optionally include additional components as describe herein, including one or more antioxidants, photoinitiators, slip additives and the like.

{Examples of suitable radiation-curable Secondary Coating compositions which may be used variously to form coating compositions are described in, for example, U.S. Pat. Nos. 4,624,994, 4,682,851, 4,782,129, 4,794,133, 4,806,574, 4,849,462, 5,219,896 and 5,336,563. The novel Alpha Oligomer of the present invention can be used in such coatings to reduce the overall urethane content of the Secondary Coating and to improve their physical and/or chemical properties.}

The Alpha Oligomer

The Secondary Coating composition of the invention comprises an Alpha Oligomer that is derived from an anhydride. The Alpha Oligomer preferably is formed by reaction of:
(a) a hydroxyl-containing (meth)acrylate (also referred to herein as an "acrylate");
(b) an anhydride;
(c) a mono- or multi-functional epoxy-containing compound; and
(d) optionally an extender,
(e) one or more catalysts.

The reaction can also be carried out in the presence of antioxidants. In some embodiments, the oligomer according to the invention is made by reacting (a) a hydroxyl-containing (meth)acrylate, and (b) an anhydride and reacting the reaction product of the acrylate and anhydride with (c) an epoxy-containing compound. The oligomer thus formed will comprise an acrylate residue, a diester residue derived from anhydride compound, a secondary alcohol-containing residue derived from the epoxy-containing compound, and optionally an extender residue. Generally, acrylates are preferred over methacrylates because compositions having higher cure speeds can be obtained.

Preferably the molar ratio of the acrylate residue to the diester residue in the Alpha Oligomer of the invention is substantially equal. For example, the mole ratio of the acrylate residue to the diester residue in the oligomer desirably ranges from about 0.8:1 to about 1:0.8. Preferably the acrylate, diester, and secondary alcohol residues within the oligomer are linked such that the acrylate residue is bound to a diester residue which is bound to a secondary alcohol residue. More preferably, the acrylate (A), diester (B), secondary alcohol (C), and optional extender (D) residues within the oligomer are linked together substantially as follows:

-A-B-C-B-A- or -A-B-C-B-D-B-C-R-A-.

The hydroxyl-containing (meth)acrylate can be any compound comprising an acrylate or (meth)acrylate group and an alcohol group. Typically the acrylate is selected from the group consisting of hydroxyethyl acrylate (HEA), 1,4-butylene glycol monoacrylate, tripropylene glycol monoacrylate (TPGMA), polyethylene glycol monoacrylate, polypropylene glycol monoacrylate (PPA6), ethylene glycol dimethacrylate, 1,3-butylene glycol diacrylate, 1,4-butylene glycol diacrylate, neopentyl glycol diacrylate, 1,6-hexane glycol diacrylate, 1,6-hexane glycol dimethacrylate, polyethylene glycol diacrylate, polyethylene glycol dimethacrylate, polypropylene glycol diacrylate, polypropylene glycol dimethacrylate, 2,2-bis(4-acryloxydiethoxyphenyl)propane, tripropylene glycol diacrylate (TPGDA), 2,2-bis(4-acryloxypropyloxyphenyl)propane, 2,2-bis(4-methacryloxyethoxyphenyl)propane, 2,2-bis(4-methacryloxydiethoxyphenyl) propane, trimethylol propane triacrylate (e.g., SR-351), trimethylol propane trimethacrylate, tetramethylol methane triacrylate, pentaerithrytol triacrylate (e.g., SR-444), polyester acrylate oligomer, polyamide acrylate, polyester monoacrylate, caprolactone acrylates such as TONE™ caprolactone acrylates sold by Dow Chemical and SR-495 polycaprolactone acrylate alcohol sold by Sartomer, epoxyacrylate, diacrylate derivative of diglycidyl ether of bisphenol A, bisphenol A based epoxy diacrylate (e.g., CN-120 or CN-120Z), and combinations thereof. Preferably the acrylate is selected from HEA, PPA6, caprolactone acrylates, TPGMA, pentaerithrytol triacrylate (e.g., SR-444), diacrylate derivative of diglycidyl ether of bisphenol A, bisphenol A based epoxy diacrylate (e.g., CN-120), and combinations thereof. More preferably the acrylate is HEA.

The anhydride is any anhydride of a saturated or unsaturated polybasic acid. Typically, the saturated or unsaturated polybasic acid is a polyfunctional carboxylic acid. For example, the polybasic acid is an aromatic or aliphatic dibasic carboxylic acid selected from the group consisting of phthalic acid, isophthalic acid, terephthalic acid, maleic acid, fumaric acid, itaconic acid, adipic acid, glutaric acid, azelaic acid, sebacic acid, citric acid, trimellitic acid, pyromellitic acid, dodecane dicarboxylic acid, dodecane dioic acid, cyclohexane dicarboxylic acid, tetrahydrophthalic acid, methylene tetrahydrophthalic acid, hexahydrophthalic acid, succinic acid or lower alkyl esters thereof, and combinations thereof. Preferably the anhydride is selected from the group consisting of hexahydrophthalic anhydride (HHPA), methylhexahydrophthalic anhydride (MHHPA), succinic anhydride (SA), phthalic anhydride (PA), maleic anhydride (MA), dodecenyl-succinic anhydride (DDSA), octenyl succinic anhydride (OSA), tetrahydrophthalic anhydride, trimelitic anhydride, and combinations thereof.

The epoxy-containing compound is any compound or resin containing one or more epoxy groups per molecule, preferably two epoxy groups per molecule. For example, the epoxy-containing compound can be an aromatic or cycloaliphatic compound or resin comprising one or more epoxy groups per molecule. Preferably the epoxy-containing compound is an aromatic epoxy-containing compound. Suitable epoxy-containing compounds include diglycidyl ethers such as bisphenol A diglycidyl ether (e.g., EPON Resins sold by Hexion Specialty Chemicals including bisphenol A epichlorohydrin epoxy unmodified liquid resins, MW=700, sold as EPON 825 and EPON 828 (CAS No. 25068-38-6); YD-126 bisphenol A epichlorohydrin epoxy resin sold by TRInternational), cyclohexene oxide, styrene oxide, glycidyl amine epoxy resin, diglycidyl aniline, diglycidyl toluidine, diglycidyl ether, butane diol glycidyl ether, propylene glycol glycidyl ether, 2-glycidyl phenyl glycidyl ether, resorcinol diglycidyl ether, alkylphenol glycidyl ether, phenyl glycidyl ether, butyl glycidyl ether, cresol glycidyl ether, glycidyl aniline, glycidyl toluidine, polyepoxides based on hydrogenated bisphenol, glycidyl ethers of a bisphenol, polyepoxides based on phenolic novalac resins and epoxidized polybutadienes, a diepoxy carboxylate cycloaliphatic liquid epoxy resin such as isopropylidene[4,4'-bis(2,3-epoxypropoxy)cyclohexane], versatic acid monoglycidyl ether (VAME), and the like. Preferably, the epoxy-containing compound is a bisphenol A based epoxy resin such as EPON 825 or EPON 828 sold by Hexion Specialty Chemicals and the like.

As discussed above, an extender can optionally be used to make the oligomer. The extender is a polyol, polyester, polyalkyd, fatty acid, oil, or derivative thereof. Moreover, the extender can have any suitable molecular weight. When the extender is a polyol, the polyol can have any suitable number of alcohol groups, for example the polyol can have 2-10 alcohol groups, preferably 2-4 alcohol groups, or can be a polyether polyol, such as an aliphatic polyether polyol or a cyclic polyether polyol. It is preferred to use alcohols that are substituted in the β-position such that there is no β-hydrogen present which would be susceptible to hydrolytic instability.

Suitable diols include, for example, 1,2-propanediol, 1,3-propanediol, 1,4-butanediol, 1,2-butanediol, 1,3-butanediol, 1,5-pentanediol, 1,6-hexanediol, 1,9-nonanediol, ethylene glycol, diethylene glycol, triethylene glycol, polyethylene glycol, dipropylene glycol, polypropylene glycol, neopentyl glycol, 2-methyl-1,3-propane diol. 2,2-dimethyl-1,3-propanediol, 2-ethyl-1,3-propanediol, 2,2-diethyl-1,3-propanediol, 2-propyl-2-methyl-1,3-propanediol. 2-propyl-2-ethyl-1,3-propanediol, 2-butyl-2-ethyl-1,3-propanediol (BEPD), hydroxy pivaloyl hydroxy pivalate (HPHP), 2-cyclohexyl-2-methyl-1,3-propanediol, 2-phenyl-2-methyl-1.3 propanediol, 1,4-cyclohexanediol, 2,4-diethyl-1,5-pentane diol, or alkoxylated derivatives of all the above diols, such as preferably, ethoxylated and propoxylated derivatives thereof. Also suitable are $C_{36}$-diols such as Pripol 2033 diol (supplied by Uniqema) and Speziol C36/2 diol (supplied by Cognis). These diol components can be used in admixture. Suitable diols for use as extenders are further described in U.S. Pat. No. 6,023,547 which is incorporated by reference herein. Preferred diols which can be used as extenders are ethoxylated bisphenol-A, propoxylated bisphenol-A, neopentyl glycol (NPG), 2-butyl-2-ethyl-1,3-propane diol (BEPD), 2-methyl-1,3-propanediol (MPD), hydroxy pivaloyl hydroxy pivalate (HPHP), hydrogenated analogs of dimer acids, 2,4-diethyl-1,5-pentane diol or mixtures thereof.

Other suitable polyols include, for example, triols such as glycerol, trimethylolethane (i.e., 1,1,1-tris(hydroxymethyl) ethane), and trimethylolpropane (i.e., 1,1,1-tris(hydroxymethyl)propane); tetraols such as pentaerythritol; pentaols such as glucose; hexaols such as dipentaerythritol and sorbitol; or alkoxylated derivatives of all the above polyalcohols, such as preferably, ethoxylated and propoxylated derivatives thereof, ethoxylated bisphenol-A having 2-12 ethylene oxide units, propoxylated bisphenol-A having 2-12 propylene oxide units, sugars, halogenated sugars such as trichlorinated sucrose (sucralose), glycerins, and the like. In some embodiments, the polyol preferably is a diol. Advantageous of the diols is their relative apolar character, the reduced ester content of the resulting oligomer and their low $T_g$.

Suitable aliphatic polyether polyols include polyethylene glycol, polypropylene glycol, polytetramethylene glycol, polyhexamethylene glycol, polyheptamethylene glycol, polydecamethylene glycol, a polyether polyol obtained by the ring-opening copolymerization of two or more ion-polymerizable cyclic compounds and the like. Examples of ion-polymerizable cyclic compounds include cyclic ethers such as ethylene oxide, propylene oxide, 1,2-butylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate can be given. Moreover, polyether polyols obtained by ring-opening copolymerization of the above ion-polymerizable cyclic compounds with monomers, for example, cyclic imines such as ethyleneimine, cyclic lactone acids such as propyolactone and glycolic acid lactide, and dimethylcyclopolysiloxanes can be used. As examples of specific combinations of two or more ion-polymerizable cyclic compounds, combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like can be given. The ring-opening copolymer of these ion-polymerizable cyclic compounds can be either a random copolymer or a block copolymer.

Suitable cyclic polyether polyols include an alkylene oxide addition diol of bisphenol A, alkylene oxide addition diol of bisphenol F, hydrogenated bisphenol A, hydrogenated bisphenol F, alkylene oxide addition diol of hydrogenated bisphenol A, alkylene oxide addition diol of hydrogenated bisphenol F, alkylene oxide addition diol of hydroquinone, alkylene oxide addition diol of naphthohydroquinone, alkylene oxide addition diol of anthrahydroquinone, 1,4-cyclohexanediol and alkylene oxide addition diol thereof, tricyclodecanediol, tricyclodecanedimethanol, pentacyclopentadecanediol, pentacyclopentadecanedimethanol, and the like. Of these, the alkylene oxide addition diol of bisphenol A, tricyclodecanedimethanol, and the like are preferable. Among the above polyether polyols, at least one polyether polyol selected from the group consisting of polypropylene glycol, a copolymer of 1,2-butylene oxide and ethylene oxide, and a copolymer of propylene oxide and ethylene oxide is preferable.

In some embodiments, the polyol preferably is selected from the group consisting of polyester polyols or polyether polyols. Examples of polyether polyols include, for instance, polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds (e.g. ethylene oxide, propylene oxide, isobutene oxide, tetrahydrofuran, 2-methyltetrahydrofuran, 3-methyltetrahydrofuran, phenyl glycidyl ether, or butyl glycidyl ether). Suitable polypropylene glycols include polypropylene glycols having a molecular weight of from about 300 g/mol to about 5,000 g/mol, for example PPG400 (MW=400 g/mol), PPG1000 (MW=1000 g/mol), PPG2000 (MW=2000 g/mol), PPG3000 (MW=3000 g/mol), as well as EXCENOL. 720 (MW=700 g/mol), EXCENOL 1020 (MW=1000 g/mol), and EXCENOL 2020 (MW=2000 g/mol) (manufactured by Asahi Glass Urethane Co., Ltd.). Suitable polyols further include copolymer polyols of 1,2-butylene oxide and ethylene oxide having a molecular weight of about 300 g/mol to about 5,000 g/mol, for example EO/BO500 (MW=5000 g/mol), EO/BO1000 (MW=1000 g/mol). EO/BO2000 (MW=2000 g/mol), EO/BO03000 (MW=3000 g/mol), EO/BO4000 (MW=4000 g/mol) (manufactured by Daiichi Kogyo Seiyaku Co., Ltd.).

Suitable polyols also include polyester polyols obtained by reacting a polyhydric alcohol (e.g. ethylene glycol, a polyethylene glycol, propylene glycol, a polypropylene glycol, tetramethylene glycol, a polytetramethylene glycol, 1,6-hexanediol, neopentyl glycol, 1,4-cyclohexane dimethanol, 3-methyl-1,5-pentanediol, 1,9-nonanediol, and 2-methyl-1,8-octanediol) with a polybasic acid (e.g., phthalic acid, isophthalic acid, terephthalic acid, maleic acid, fumaric acid, adipic acid, and sebacic acid) such as those commercially available under the trademarks MPD/IPA500 (MW=500 g/mol), MPD/IPA1000 (MW=1000 g/mol), MPD/IPA2000 (MW=2000 g/mol), MPD/TPA500 (MW=500 g/mol), MPD/IPA1000 (MW=1000 g/mol), MPD/TPA2000 (MW=2000 g/mol), Kurapol A-1010 (MW=1000 g/mol), A-2010 (MW=2000 g/mol), PNA-2000 (MW=2000 g/mol), PNOA-1010 (MW=1000 g/mol), and PNOA-2010 (MW=2000 g/mol) (manufactured by Kuraray Co., Ltd.). Commercially available polycarbonate polyols include DN-980 (MW=2000 g/mol) and DN-981 (MW=1000 g/mol) (manufactured by Nippon Polyurethane Industry Co., Ltd.), dimerized fatty acid-based polyester polyols such as Priplast 3196 (MW=3000 g/mol), Priplast 3190 (MW=2000 g/mol), and Priplast 2033 (MW=570 g/mol) (manufactured by Uniqema), poly(alkylenecarbonate)glycols which are random copolymers of 1,9-nonamethylene diol and 2-methyl octamethylene glycol such as PNOC-2000 and PNOC-1000 (manufactured by Kuraray Co., Ltd.), polycaprolactone diols such as PLACCEL CD220 (MW=2,000 g/mol), CD210 (MW=1,000 g/mol), CD208 (MW=830 g/mol), CD205 (MW=500 g/mol) (manufactured by Daicel Chemical Industries, Ltd.), and a polyetherpolycarbonate diol such as PC-TF-CD (MW=1,000 g/mol or 2,000 g/mol) (manufactured by BASF).

Other examples of suitable polyester polyols are provided in U.S. Patent Application Publication 2004/0209994 A1 (Terwillegar), which is incorporated by reference herein. These polyols may be used either individually or in combinations of two or more. In addition, the polyols described above, alone or in combination, may be reacted at each end with anhydride (examples of which are described above) to form a diacid which can serve as an extender in the invention. Such diacids can be further used to synthesize polyester based extenders.

Dimer acids (and esters thereof) are a well known commercially available class of dicarboxylic acids (or esters). They are typically prepared by dimerizing unsaturated long chain aliphatic monocarboxylic acids, usually of 13 to 22 carbon atoms, or their esters (e.g. alkyl esters). The dimerization is thought by those in the art to proceed by possible mechanisms which include Diels-Alder, free radical, and carbonium ion mechanisms. The dimer acid will usually contain 26 to 44 carbon atoms. Preferably the dimer acids (or esters) are derived from $C_{18}$ and $C_{22}$ unsaturated monocarboxylic acids (or esters) which will yield, respectively, $C_3$ and $C_{44}$ dimer acids (or esters). Dimer acids derived from $C_{18}$ unsaturated acids, which include acids such as linoleic and linolenic are particularly well known (yielding $C_{36}$ dimer acids). The dimer acid products will normally also contain a proportion of trimer acids (e.g., $C_{54}$ acids when using $C_{18}$ starting acids), possibly even higher oligomers and also small amounts of the monomer acids. Several different grades of dimer acids are available from commercial sources and these differ from each other primarily in the amount of monobasic and trimer acid fractions and the degree of unsaturation.

Usually the dimer acid (or ester) products as initially formed are unsaturated which could possibly be detrimental to their oxidative stability by providing sites for crosslinking or degradation, and so resulting in changes in the physical properties of the coating films with time. It is therefore preferable (although not essential) to use dimer acid products which have been hydrogenated to remove a substantial proportion of the unreacted double bonds. Herein the term "dimer acid" is used to refer to both the diacid itself, its ester derivatives, such as lower alkyl esters, which would act as an acid component in polyester synthesis, and includes any trimer or monomer if present.

Another class of suitable extender compounds is alkyds. An alkyd, or alkyd resin, is a type of polyester having one or more ester groups pendant from a main polymer chain of ester linkages. Alkyd resins can be prepared by condensation reactions of polyols, polyfunctional carboxylic acids (hereafter referred to as polyacids), and oils or fatty acids derived from the oils. The oil can be a natural oil which consists of an ester, e.g., a triester of glycerol and fatty acids. For example, a polyol/fatty acid mixture can be prepared in situ by alcoholysis of a naturally derived oil or by direct esterification of a polyol with a naturally derived long chain fatty acid. The resulting product from either of these reactions can then be polymerized with other polyols and polyacids (e.g., diols and diacids) as in conventional polyesterification. More preferably, the alkyd is prepared by alcoholysis of a naturally derived oil, preferably one with a low degree of unsaturation. The pendant ester group of the alkyd can be introduced by including a monofunctional carboxylic acid (monoacid) along with the customary components used to prepare a polyester. The monoacid used to prepare the alkyd can be any monocarboxylic acid having between 4 and 28 carbon atoms. Preferably, the monoacid is a fatty acid, more preferably a long chain monoacid. A long chain monoacid, or long chain fatty acid, is characterized as having between 12 and 28 carbon atoms in their chain; more preferably, between 12 and 24 carbon atoms. Most fatty acids have 18 carbon atoms in their chain, but also a higher number of carbon atoms in naturally derived oils is possible. For example, $C_{22}$ acid, erucic acid (docosenoic acid), is found in some varieties of rapeseed oil. Preferably, naturally derived fatty acids or oils from which fatty acids are derived, as known to those skilled in the art, are fatty acids or oils originating from vegetable or animal sources.

Other classes of suitable extenders, closely related to alkyds, are fatty acids and oils. The fatty acids or oils suitable in the alkyd backbones according to the present invention can be unsaturated or saturated. Preferably, the fatty acids or oils have a low degree of unsaturation, as defined hereunder. Examples of unsaturated oils or fatty acids (derived from the oils) include castor oil, corn oil, cottonseed oil, rapeseed oil, low eruric rapeseed oil, hempseed oil, kapok oil, linseed oil, wild mustard, oiticica oil, olive oil, palm oil, peanut oil, perilla oil, poppyseed oil, tobaccoseed oil, argentine rapeseed oil, rubberseed oil, safflower oil, sesame oil, soybean oil, sugarcane oil, sunflower oil, tall oil, teaseed oil, tung oil, black walnut oil, or mixtures thereof, and the like. Examples of fatty acids/oils having a low degree of unsaturation include coconut oil, babassu oil, Chinese tallow oil, ouri-curl oil, palm kernel oil, caprylic acid, caproic acid, capric acid, coconut fatty acid, lauric acid, myristic acid, palmitic acid, stearic acid, and the like or mixtures thereof, fatty acids derived from the oils, as well as the hydrogenated form of unsaturated oils and fatty acids derived from the oils, such as castor oil, corn oil, cottonseed oil, rapeseed oil, low eruric rapeseed oil, hempseed oil, kapok oil, linseed oil, wild mustard, oiticica oil, olive oil, palm oil, peanut oil, perilla oil, poppyseed oil, tobaccoseed oil, argentine rapeseed oil, rubberseed oil, safflower oil, sesame oil, soybean oil, sugarcane oil, sunflower oil, tall oil, teaseed oil, tung oil, black walnut oil, or mixtures thereof, and the like.

The Alpha Oligomer of the invention can be prepared using any suitable method. For example, the Alpha Oligomer can be prepared following a 1-step process in which the acrylate, anhydride, epoxy-containing compound, and optional extender compound are all charged together in a reactor. The reaction can be carried out at a temperature ranging from about 80° C. to about 150° C., typically from about 90° C. to about 130° C., preferably from about 100° C. to about 140° C., more preferably about 110° C. to about 130° C., at atmospheric or reduced pressure.

Preferably, the Alpha Oligomer is prepared according to a 2-step synthesis process. During the first step of the 2-step process, the Alpha Oligomer is prepared by combining the acrylate, the anhydride, and optionally the extender compound, and reacting the components at a temperature in the range of from about 90° C. to about 130° C., preferably from about 100° C. to about 120° C., more preferably from about 105° C. to about 115° C. Preferably this step is carried out under air atmosphere, more preferably dry air atmosphere. Without wishing to be bound by any particular theory, it is believed that during this step, an alcohol group from the acrylate and/or the extender compound, when present, reacts with the anhydride causing the anhydride ring to open to form an ester linkage and an acid group. In the second step of the 2-step process, the epoxy-containing compound is reacted with the product of step 1. In particular, the free acid group of the reaction product of step 1 (the free acid derived from the anhydride) reacts with the epoxide group to form a secondary alcohol group. The second step desirably is carried out under the same reaction conditions, such as temperature and reaction time, as described for the 1-step process above. Because of the exothermic nature of the anhydride ring-opening reaction, in some embodiments it is desirable to initially react the anhydride compound with only a portion of the acrylate until the desired reaction temperature has been reached. The reaction temperature can thereafter be maintained by adding at a controlled rate, or by drop-wise addition of, the remaining portion of the acrylate. If needed, the reaction can be heated in order to maintain the desired reaction temperature. Typically, the reaction in step 1 of the procedure is carried out within about 2-4 hours and the reaction in step 2 of the procedure is carried out within about 8-15 hours.

To inhibit polymerization of the acrylate during the reaction, an inhibitor or polymerization inhibition system can be added. Examples of suitable inhibitors include butylated hydroxytoluene (BHT), hydroquinone, derivatives of hydroquinone, such as methylether hydroquinone, 2,5-dibutyl hydroquinone (DBH), 3,5-di-tert-butyl-4-hydroxytoluene; methyl-di-tert-butylphenol; 2,6-di-tert-butyl-p-cresol; and the like, nitrobenzenes, phenothiazines, and the like. Of these, BHT and DBH are preferred since they produce a relatively low discoloration in the final oligomer.

A catalyst can be used to assist the reaction of the epoxy-containing compound during the preparation of the Alpha oligomer of the present invention, Suitable catalysts include, for example, triarylphosphine catalysts such as triphenylphosphine (TPP) and tritoluylphosphine, phosphonium salts, tertiary amines such as triethylene triamine catalysts such as 1,4-diazabicyclo[2.2.2]octane (DABCO), and metal catalysts such as chromium (III) acetate, carboxylic acid metal salts, tin catalysts such as stannous alkoxides or stannous acrylates, and titanium catalysts, many of which are known in the art. The catalysts can be used alone or in combination. In a preferred embodiment, TPP and DABCO are used in combination so as to enable the use of a low reaction temperature (e.g., 110° C.). The concentration of the catalyst in the reaction mixture generally lies between about 0.1 and about 1.0 wt. %, preferably between about 0.1 and about 0.7 wt. %, more preferably between about 0.1 and about 0.5 wt. %, and even more preferably between about 0.1 and about 0.3 wt. % (based on the total weight of the reaction mixture).

The Alpha Oligomer of the invention desirably has a low acid value and has improved hydrolytic stability. The acid value is a measure of the free carboxylic acids content of a resin and is expressed as the number of milligrams of potassium hydroxide required to neutralize the free carboxylic acids in one gram of the resin. Thus, the acid value reflects the amount of acid, for example the amount of carboxylic acid, remaining in the oligomer. The acid value can be determined by dissolving a weighed quantity of a resin in a solvent such as toluene or tetrahydrofuran (THF) together with neutralized ethyl alcohol or 50/50 isopropyl alcohol/acetone and titrating the resulting solution with carbonate-free decinormal potassium hydroxide solution to a phenolphthalein end point. It is also possible to determine the acid value potentiometrically as described further below under the test methods section. The acid value ("AV") in "mg KOH/g resin" can be expressed by formula:

$$AV=(56.1)(mL\ KOH)(normality)/(mass\ of\ resin\ (g)).$$

In some embodiments of the invention, the acid value is desirably about 20 mg KOH/g or less, preferably about 15 mg KOH/g or less, more preferably about 10 mg KOH/g or less, and even more preferably about 5 mg KOH/g or less. In some instances, the resin is substantially neutral such that the acid value is about 1 mg KOH/g resin or less. If desired, the oligomer can be washed and/or neutralized after synthesis so as to further remove excess acid.

The number average molecular weight of the Alpha Oligomer is preferably about 400 g/mol or more, but equal to or less than about 6,000 g/mol, preferably equal to or less than about 5,000 g/mol, more preferably equal to or less than about 4,000 g/mol. When the Alpha Oligomer is used in a Secondary Coating composition, preferably the number average molecular weight is about 2,000 g/mol or less, more preferably about 1,500 g/mol or less, and about 500 g/mol or more, more preferably about 800 g/mol or more. The number average molecular weight of the Alpha Oligomer can be tailored, in part, through selection of an extender compound of appropriate molecular weight.

After the Alpha Oligomer is prepared, the percentage of urethane linkages in the oligomer can be calculated by multiplying the number of urethane linkages in the theoretical structure by the molecular weight of a urethane linkage (42 g/mol) and dividing by the molecular weight of the theoretical oligomer structure.

The Beta Oligomer

In accordance with another embodiment of the invention, the Secondary Coating composition preferably further comprises a second oligomer (the Beta Oligomer) in addition to the Alpha Oligomer. The presence of the Beta Oligomer in addition to the Alpha Oligomer described above provides a composition having more balanced coating properties, for example, an improved cured surface with a low attaching force and low coefficient of friction after curing. One advantage of this embodiment of the invention is to provide the cured coating composition with a lower modulus while maintaining a high $T_g$ or tan $\delta_{max}$. In some embodiments, it is desirable that the Beta Oligomer have a different molecular weight than the Alpha Oligomer. The Beta Oligomer may contain urethane or, alternatively, may be urethane-free, for example a urethane-free oligomer derived from an anhydride as described above for the Alpha Oligomer. The Beta Oligomer is typically a urethane-containing oligomer, for example, a urethane-containing oligomer prepared in accordance with the teachings of International Patent Publication No. WO 2005/026228 A1, or U.S. Pat. Nos. 5,527,835, 6,298,189, 6,584,263. 6,661,959, 6,775,451, or 6,872,760, each of which is incorporated by reference herein. Desirably the Beta Oligomer has a low $T_g$ and a high elongation if cured by itself, and not as part of a Secondary Coating.

When the Beta Oligomer is derived from an anhydride as described above for the Alpha Oligomer, then a suitable molecular weight extender is chosen such that the Beta Oligomer has a different and higher molecular weight than the Alpha Oligomer.

When the Beta Oligomer is a urethane-containing oligomer, it generally is produced by reacting a polyether polyol or other suitable extender compound, a polyisocyanate, and an acrylate containing a hydroxyl group, preferably in the presence of a catalyst. For example, a urethane acrylate oligomer suitable for use as the Beta Oligomer can be produced by reacting isocyanate groups of a polyisocyanate respectively with a hydroxyl group of a polyol and a hydroxyl group of an acrylate containing a hydroxyl group. This reaction can be carried out by several methods as follows: (a) charging a polyol, polyisocyanate, and acrylate containing a hydroxyl group and reacting them together; (b) reacting a polyol and a polyisocyanate, and reacting the resulting product with an acrylate containing a hydroxyl group; (c) reacting a polyisocyanate and acrylate containing a hydroxyl group, and reacting the resulting product with a polyol; or (d) reacting a polyisocyanate and acrylate containing a hydroxyl group, reacting the resulting product with a polyol, and further reacting the resulting product with an acrylate containing a hydroxyl group. The reaction is typically carried out in the presence of a urethanation catalyst.

Catalysts in the art of synthesizing urethane based oligomers for use in radiation curable coatings for optical fiber are known in the art. Suitable catalysts for the Beta Oligomer described herein, when said Beta Oligomer is a urethane based oligomer, may be selected from the group consisting of dibutyl tin dilaurate (DBTDL); metal carboxylates, including, but not limited to: organobismuth catalysts such as bismuth neodecanoate, CAS 34364-26-6; zinc neodecanoate, CAS 27253-29-8; zirconium neodecanoate, CAS 39049-04-2; and zinc 2-ethylhexanoate, CAS 136-53-8; sulfonic acids, including but not limited to dodecylbenzene sulfonic acid, CAS 27176-87-0; and methane sulfonic acid, CAS 75-75-2; amino or organo-base catalysts, including, but not limited to: 1,2-dimethylimidazole, CAS 1739-84-0 (very weak base); and diazabicyclo[2.2.2]octane (DABCO). CAS 280-57-9 (strong base); and triphenyl phosphine (TPP); alkoxides of zirconium and titanium, including, but not limited to zirconium butoxide, (tetrabutyl zirconate) CAS 1071-76-7: and titanium butoxide, (tetrabutyl titanate) CAS 5593-70-4; and ionic liquid phosphonium, imidazolium, and pyridinium salts, such as, but not limited to, trihexyl(tetradecyl)phosphonium hexafluorophosphate, CAS No. 374683-44-0; 1-butyl-3-methylimidazolium acetate, CAS No. 284049-75-8; and N-butyl-4-methylpyridinium chloride, CAS No. 125652-55-3; and tetradecyl(trihexyl) phosphonium chloride, commercially available as Cyphosil 101.

All of these catalysts are commercially available. It is now known that all of these catalysts may be used in the free, soluble, and homogeneous state, or they may be tethered to inert agents such as silica gel, or divinyl crosslinked macroreticular resins, and used in the heterogeneous state to be filtered at the conclusion of oligomer synthesis.

Any of the acrylate compounds described above with respect to the Alpha Oligomer can be used to make the Beta Oligomer. The preferred acrylate is HEA.

One or more diisocyanates can be used to make the Beta Oligome. These diisocyanates may be selected from the group consisting of aromatic diisocyanates and aliphatic diisocyanates such as, but not limited to, 2,4-toluene diisocyanate, 2,6-toluene diisocyanate, 1,3-xlylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxlylene diisocyanate and 2,5 (or 6)-bis(isocyanatomethyl)-bicyclo[2.2.1]heptane. In one embodiment an isophorone diisocyanate and toluene diisocyanate are preferred. In one embodiment, toluene diisocyanate, used by itself, is preferred.

Further, any of the polyol extender compounds described above with respect to the Alpha Oligomer can be used to produce the Beta Oligomer. Preferably, the polyol used to produce the Beta Oligomer is a polyester polyol or polyether polyol, for example a polyether polyol selected from the group consisting of polypropylene glycol, a copolymer of 1,2-butylene oxide and ethylene oxide, and a copolymer of propylene oxide and ethylene oxide. The number average molecular weight of the polyol extender is preferably in the range of from about 300 g/mol to about 10,000 g/mol. Preferably, the extender is polypropylene glycol having a number average molecular weight of about 1000 g/mol.

In some embodiments, both the Alpha Oligomer and Beta Oligomer comprise a polyol extender residue, wherein the polyol used to produce the Alpha Oligomer differs from the polyol used to produce the Beta Oligomer at least with respect to molecular weight. The polyol used in the Alpha Oligomer can also differ in chemical structure from the polyol used in the Beta Oligomer. For example, the polyol used to produce the Alpha Oligomer can be a copolymer of 1,2-butylene oxide and ethylene oxide while the polyol used to produce the Beta Oligomer can be polypropylene glycol. Also, the polyol used to produce the Alpha Oligomer can be a polyester polyol while the polyol compound used to produce the Beta Oligomer is a polyether polyol.

The number average molecular weight of the Beta Oligomer is desirably about 3,000 to about 10,000 g/mol, more preferably about 7,000 to about 9,000 g/mol. For this reason, the extender used for the Beta Oligomer is selected according to the molecular weight. Suitable polyol extender compounds include polyester polyols and polyether polyols, for example commercially available PREMINOL PML S-X4008 (MW=8,000 g/mol), PML S-4011 (MW=10,000 g/mol), PML S—X3008 (MW=8,000 g/mol), PML S-3011 (MW=10,000 g/mol), PML S-X3015 (MW=15,000 g/mol), PML 4016 (MW=16,000), PML 7001 (MW=6,000 g/mol), PML 7003 (MW=6,200 g/mol), and PML 7012 (MW=10,000 g/mol) (manufactured by Asahi Glass Co., Ltd.), and Perminol P1010, (molecular weight=1000 g/mole), (manufactured by BASF).

When the Beta Oligomer is a urethane-containing oligomer, the proportion of the polyol or other extender, polyisocyanate, and acrylate containing a hydroxyl group is preferably determined so that isocyanate groups included in the polyisocyanate and hydroxyl groups included in the acrylate containing a hydroxyl group are, respectively, 1.1-3 equivalents and 0.2-1.5 equivalents for one equivalent of hydroxyl groups included in the polyol.

The total amount of the Alpha Oligomer and Beta Oligomer included in the radiation curable, optical fiber coating composition of the present invention is usually from about 30 to about 95 wt. %, preferably from about 35 to about 95 wt. %, more preferably from about 40 to about 80 wt. %, and most preferably from about 50 to about 80 wt. % based on the total weight of the composition. The Beta Oligomer desirably is present in the composition in an amount of from about 0.1 to about 30 wt. %, preferably from about 1 to about 25 wt. %, and more preferably from about 3 to about 20 wt. % of the total amount of the Alpha Oligomer and the Beta Oligomer present in the composition.

Using the Alpha Oligomer in accordance with one aspect of the present invention in combination with a urethane-containing Beta Oligomer in a Secondary Coating composition, particularly the oligomer described in WO 2005/026228 A1, is desirable to achieve a cured coating having a relatively low modulus while maintaining a higher $T_g$. This is believed to be due to micro-phase separation within the finished coating. The modulus of the cured coating is less than 1500 MPa, preferably less than 1000 MPa, while the $T_g$ of the cured coating is about 70° C. or greater. In this preferred embodiment, the radiation curable composition comprises Alpha Oligomer and a urethane acrylate Beta Oligomer having a structure derived from a polyol and having a number average molecular weight of about 4,000 g/mol or more, but less than about 16,000 g/mol, wherein the composition comprises from about 30 to about 95 wt % of the Alpha Oligomer and Beta Oligomer and the Beta Oligomer is from about 0.1 to about 30 wt % of the total amount of the Alpha Oligomer and Beta Oligomer present in the composition.

In some embodiments, the Beta Oligomer is a urethane oligomer obtained by reacting 1 mol of diisocyanate with 2 moles of acrylate containing a hydroxyl group without using the polyol. Given as examples of such a urethane acrylate are the reaction products of hydroxyethyl acrylate (HEA) and 2,4-toluene diisocyanate; HEA and 2,5 (or 6)-bis(isocyanatomethyl)-bicyclo[2.2.1]heptane; HEA and isophorone diisocyanate; HEA and 2,4-toluene diisocyanate, and HEA and isophorone diisocyanate. The teachings of U.S. Pat. Nos. 5,527,835, 6,298,189, 6,584,263, 6,661,959, 6,775,451, or 6,872,760, each of which is incorporated by reference herein, describe additional suitable ways of achieving conventional urethane acrylate materials, however, these prior teachings are in no way limiting examples.

In other embodiments, the Beta Oligomer is a urethane free oligomer obtained by reacting an anhydride with a hydroxyl-containing acrylate.

| Material: | Eq. wt. | # eq. | Wt. | wt. % |
|---|---|---|---|---|
| anhydride (HHPA) | 154 | 1.3333 | 205.33 | 27.49 |
| hydroxyl-containing (meth)acrylate (HEA) | 116.12 | 0.6667 | 77.417 | 10.36 |
| epoxy (YD-126) | 183 | 1.3334 | 244.01 | 32.67 |
| polyol (poly(tetrahydrofuran)diol, PTHF 650) | 327.54 | 0.6666 | 218.34 | 29.23 |
| catalyst (triphenylphosphine) | | | 0.93 | 0.12 |
| catalyst (DABCO) | | | 0.28 | 0.04 |
| polymerization inhibitor (BHT) | | | 0.67 | 0.09 |
| total | | | 746.9771 | 100.00 |

The order of addition is as follows: (1) BHT, (2) HHPA; and then (3) PTHF650. After a reaction midpoint is achieved, (4) TPP, (5) DABCO, and (6) EPOTEC YD-126 are added.

The Alpha Oligomer of the invention can be blended with the Beta Oligomer (to form a Secondary Coating Oligomer Blend) in a coating composition by any suitable method and in any relative amount. The overall percentage of urethane linkages in the resulting coating composition can be determined from the molar amount of isocyanate compound used in the reaction as follows.

% urethane=[(wt. % isocyanate used/MW isocyanate)×(MW urethane)]/coating weight

The reactive functionality terminus of the Alpha Oligomer desirably is reactive when exposed to actinic radiation. Preferably, the radiation-curable reactive-functionality terminus includes ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, N-vinyl, or styrene functionality, most preferably acrylate functionality. The oligomer is useful in UV-curable optical fiber coating compositions.

The Gamma Oligomer

In a preferred embodiment of the invention, the Secondary Coating composition includes a third oligomer (the Gamma Oligomer). The Gamma Oligomer can be derived from an anhydride such that it is urethane free, or, alternatively, can be a urethane containing oligomer. Typically the Gamma Oligomer is an epoxy diacrylate and is free of a urethane component. The preferred epoxy diacrylate is CN-120 or CN-120Z, a bisphenol A based epoxy diacrylate. The Gamma Oligomer desirably has a number average molecular weight of about 500 g/mol or less, and an elongation if cured by itself, and not as part of a Radiation Curable Secondary Coating.

The Alpha Oligomer of the invention can be blended with the Beta Oligomer and Gamma Oligomer if present (to form a Secondary Coating Oligomer Blend) in a coating composition by any suitable method and in any relative amount.

Reactive Diluents

The radiation-curable coating compositions of the invention optionally further comprise at least one reactive diluent which can be used to adjust the viscosity of the compositions. Reactive diluents can be low viscosity monomers having at least one functional group capable of polymerization when exposed to actinic radiation. This functional group may be of the same nature as that used in the radiation-curable Alpha Oligomer or Beta Oligomer. Preferably, the functional group present in the reactive diluent is capable of copolymerizing with the radiation-curable functional group present in the Alpha Oligomer or Beta Oligomer. More preferably, the radiation-curable functional group forms free radicals during curing which can react with the free radicals generated on the surface of surface-treated optical fiber.

For example, the reactive diluent can be a monomer or mixture of monomers having an acrylate or vinyl ether functionality and a $C_4$-$C_{20}$ alkyl or polyether moiety. Particular examples of such reactive diluents include hexylacrylate, 2-ethylhexylacrylate, isobornylacrylate, decylacrylate, laurylacrylate, stearylacrylate, 2-ethoxyethoxy-ethylacrylate, laurylvinylether, 2-ethylhexylvinyl ether, isodecyl acrylate, isooctyl acrylate, N-vinyl-caprolactam, N-vinylpyrrolidone, tripropylene glycol acrylate, acrylamides, and the alkoxylated derivatives, such as, ethoxylated lauryl acrylate, ethoxylated isodecyl acrylate, and the like.

Another type of reactive diluent that can be used is a compound having an aromatic group. Particular examples of reactive diluents having an aromatic group include ethylene glycol phenyl ether acrylate, polyethylene glycol phenyl ether acrylate, polypropylene glycol phenyl ether acrylate, and alkyl-substituted phenyl derivatives of the above monomers, such as polyethylene glycol nonylphenyl ether acrylate. Ethoxylated nonylphenol acrylate is also suitable.

The reactive diluent can also comprise a diluent having two or more functional groups capable of polymerization. Particular examples of such diluents include $C_2$-$C_{18}$ hydrocarbon-diol diacrylates, $C_4$-$C_{18}$ hydrocarbon divinylethers, $C_3$-$C_{18}$ hydrocarbon triacrylates, and the polyether analogues thereof, and the like, such as 1,6-hexanedioldiacrylate, trimethylolpropanetriacrylate, hexanedioldivinylether, triethylene-glycoldiacrylate, pentaerythritol-triacrylate, ethoxylated bisphenol-A diacrylate, tripropyleneglycol diacrylate, and tris-2-hydroxyethyl isocyanurate triacrylate (SR-368).

Antioxidant

The antioxidant is a sterically hindered phenolic compound, for example 2,6-ditertiarybutyl-4-methylphenol, 2,6-ditertiarybutyl-4-ethyl phenol, 2,6-ditertiarybutyl-4-n-butyl phenol, 4-hydroxymethyl-2,6-ditertiarybutyl phenol, and such commercially available compounds as thiodiethylene bis(3,5-ditertiarybutyl-4-hydroxyl)hydrocinnamate, octadecyl-3,5-ditertiarybutyl-4-hydroxyhydrocinnamate, 1,6-hexamethylene bis(3,5-ditertiarybutyl-4-hydroxyhydrocinnamate), and tetrakis(methylene(3,5-ditertiary-butyl-4-hydroxyhydrocinnamate))methane, all available as Irganox 1035, 1076, 259 and 1010, respectively, from Ciba Geigy. Other examples of sterically hindered phenolics useful herein include 1,3,5-trimethyl-2,4,6-tris(3,5-ditertiarybutyl-4-hydroxybenzyl)benzene and 4,4'-methylene-bis(2,6-ditertiarybutylphenol), available as Ethyl 330 and 702, respectively, from Ethyl Corporation. Preferably the antioxidant preferably is thiodiethylene bis(3,5-ditertiarybutyl-4-hydroxyl)hydrocinnamate (e.g., Irganox 1035).

Photoinitiators

The coating composition of the invention optionally further comprises a photoinitiator or mixture of photoinitiators to facilitate cure of the compositions upon exposure to active radiation, and to provide a satisfactory cure rate. Illustrative of photoinitiators useful in the coating composition of the present invention are isobutyl benzoin ether; 2,4,6-trimethylbenzoyl, diphenylphosphine oxide; bis(2,4,6-trimethylbenzoyl)phenylphosphine oxide (sold as Irgacure 819); 1-hydroxycyclohexylphenylketone; 2-benzyl-2-dimethylamino-1-(4-morpholinophenyl)-butan-1-one; 2,2-dimethoxy-2-phenylacetophenone; perfluorinated diphenyltitanocene; 2-methyl-1-[4-(methylthio)phenyl]-2-(4-morpholinyl)-1-propanone; 2-hydroxy-2-methyl-1-phenylpropan-1-one; 4-(2-hydroxyethoxy)phenyl-2-hydroxy-2-propyl ketone dimethoxyphenylacetophenone; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-2-(2-hydroxy-2-propyl)-ketone; diethoxyphenyl acetophenone; a mixture of (2,6-dimethoxybenzoyl)-2,4,4-trimethylpentylphosphine oxide and 2-hydroxy-2-methyl-1-phenyl-propan-1-one; benzophenone; 1-propanone, 2-methyl-1-1-(4-(methylthio)phenyl)-2-(4-morpholinyl); and mixtures thereof.

The radiation curable coating composition of the present invention optionally contains one or two phosphine oxide type photoinitiators, such as 2,4,6-trimethylbenzoyldiphenylphosphine oxide type (TPO) or bisacyl phosphine oxide type (BAPO) photoinitiators, and/or α-hydroxyketo-type photoiniator (e.g., Irgacure 184 (i.e., 1-hydroxycyclohexyl phenyl ketone available from Ciba Geigy) or Darocur 1173 (i.e., 2-hydroxy-2-methyl-1-phenyl-propan-1-one available from Ciba Geigy)). Even more preferred is a mixture of BAPO, Lucirin TPO (i.e., 2,4,6-trimethylbenzoyldiphenylphosphine oxide available from BASF Corporation), Irgacure 184, Darocur 1173, and Irgacure 907 (i.e., 2-methyl-1-[4-(methylthio)phenyl]-2-morpholinopropan-1-one, available from Ciba Geigy).

Other Additives

Other additives which can be used in the coating composition include, but are not limited to, catalysts, lubricants, slip agents, wetting agents, adhesion promoters and stabilizers. The selection and use of such additives is within the skill of the art.

In a preferred embodiment of the invention, the Secondary Coating composition includes one or more slip additives. Preferred slip additives include DC-190 and DC-57. Most preferably, a blend of DC-190 and DC-57 is used. DC-57 is dimethyl, methyl(propyl(poly(EO))acetate) siloxane; CAS Registry Number 70914-12-4. DC-190 is a mixture of (a) from about 40.0 to about 70.0 weight % of dimethyl,methyl (propyl(poly(EO)(PO))acetate)siloxane; CAS Registry Number 68037-64-9; (b) from about 30.0 to about 60.0 weight % of poly(ethylene oxide propylene oxide) monoallyl ether acetate; CAS Registry Number 56090-69-8; (c) less than about 9.0 weight % polyether polyol acetate CAS Registry Number 39362-51-1. DC-57 and DC-190 are commercially available from Dow Corning.

In a preferred embodiment of the Secondary Coating composition of the invention, the weight percent of each component of the radiation curable Secondary Coating is as follows:

| Alpha Oligomer | |
|---|---|
| anhydride | from about 5 to about 7 wt. % |
| hydroxyl-containing (meth)acrylate | from about 3 to about 5 wt. % |
| epoxy | from about 5 to about 9 wt. % |
| first catalyst | from about 0.005 to about 0.25 wt. % |
| second catalyst | from about 0.01 to about 0.05 wt. % |
| polymerization inhibitor | from about 0.01 to about 0.05 wt. % |
| Beta Oligomer | |
| hydroxyl-containing (meth)acrylate | from about 3 to about 5 wt. % |
| Isocyanate | from about 4 to about 6 wt. % |
| polyether polyol | from about 13 to about 17 wt. % |
| polymerization inhibitor (e.g. BHT) | from about 0.010 to about 0.125 wt. % |
| Catalyst | from about 0.005 to about 0.025 wt. % |
| Gamma Oligomer | |
| epoxy diacrylate | from about 20 to about 30 wt. % |
| Other Additives | |
| first diluent monomer | from about 5 to about 7 wt. % |
| second diluent monomer | from about 20 to about 25 wt. % |
| antioxidant | from about 0.25 to about 1.25 wt. % |
| first photoinitiator | from about 1 to about 4 wt. % |
| second photoinitiator | from about 0.25 to about 0.95 wt. % |
| slip additives (optional) | from about 0.35 to about 0.75 wt. % |

A more highly preferred embodiment of the Secondary Coating composition of the instant claimed invention is as follows:

| | |
|---|---|
| Alpha Oligomer | 47.94 wt. % |
| anhydride (e.g., HHPA) | 6.86 wt. % |
| hydroxyl-containing (meth)acrylate (e.g., HEA) | 4.3 wt. % |
| epoxy (e.g., Epotec yd-126 or Epotec yd-128) | 7.91 wt. % |
| first catalyst (e.g., DABCO) | 0.01 wt. % |
| second catalyst (e.g., TPP) | 0.03 wt. % |
| polymerization inhibitor (e.g., BHT) | 0.03 wt. % |
| Beta Oligomer | 24.87 wt. % |
| hydroxyl-containing (meth)acrylate (e.g., HEA) | 4.3 wt. % |
| diisocyanate (e.g., TDI) | 5.12 wt. % |
| polyether polyol (e.g., P1010) | 15.44 wt. % |
| polymerization inhibitor (e.g. BHT) | 0.05 wt. % |
| catalyst (e.g., DBTDL) | 0.01 wt. % |
| Gamma Oligomer | |
| epoxy diacrylate (e.g., CN120Z) | 23 wt. % |
| Other Additives | 4.52 wt. % |
| first diluent monomer (e.g., isobornyl acrylate) | 6 wt. % |
| second diluent monomer (e.g., tripropylene glycol diacrylate) | 22.98 wt. % |
| Antioxidant (e.g., Irganox 1035) | 0.5 wt. % |
| first photoinitiator (e.g., Irgacure 184) | 2.76 wt. % |
| second photoinitiator (e.g., TPO) | 0.76 wt. % |
| slip additives (e.g., DC-57 + DC-190) | 0.5 wt. % (0.17 wt. % + 0.33 wt. %) |
| Total | 100.33 wt. %* |

*0.33 of other ingredients is not present when the optional blend of slip additives is present After a commercial Primary Coating is found, it may be applied directly onto the surface of the optical fiber. The radiation curable Primary Coating may be any commercially available radiation curable Primary Coating for optical fiber. Such commercially available radiation curable Primary Coatings are available from DSM Desotech Inc., and others, including, but without being limited to Hexion, Luvantix and PhiChem.

After the Primary Coating is applied, then the Secondary Coating is applied on top of the Primary Coating, the radiation is applied and the secondary coating is cured. When the instant claimed invention is applied as a secondary coating, the preferred type of radiation is UV.

Drawing is carried out using either wet on dry or wet on wet mode. Wet on dry mode means the liquid Primary Coating is applied wet, and then radiation is applied to cure the liquid Primary Coating to a solid layer on the wire. After the Primary Coating is cured, the Secondary Coating is applied and then cured as well. Wet on wet mode means the liquid Primary Coating is applied wet, then the Secondary Coating is applied wet and then both the Primary Coating and Secondary Coatings are cured.

If the Secondary Coating is clear rather than colored, a layer of ink coating may be applied thereon. If the Secondary Coating is colored, the ink coating layer is typically not applied onto the Secondary Coating. Regardless of whether the ink coating is applied, it is common practice to place a plurality of coated fibers alongside each other in a ribbon assembly, applying a radiation curable matrix coating thereto to hold the plurality of fibers in place in that ribbon assembly.

After the Secondary Coating is cured, a layer of "ink coating" is typically applied and then the coated and inked optical fiber is placed alongside other coated and inked optical fibers in a "ribbon assembly" and a radiation curable matrix coating is used to hold the optical fibers in the desired location in the ribbon assembly.

Secondary Coating Properties

A Secondary Coating produced from the coating composition according to the invention will desirably have properties such as modulus, toughness and elongation suitable for coating optical fiber. The Secondary Coating typically has toughness greater than about 12 J/m$^3$, a secant modulus of less than about 1500 MPa, and a $T_g$ greater than about 50° C. Preferably, the Secondary Coating has toughness greater than about 14 J/m$^3$, a secant modulus of from about 200 MPa to about 1200 MPa, and a $T_g$ greater than about 60° C. More preferably, the Secondary Coating has a toughness greater than about 16 J/m$^3$, a secant modulus of from about 400 MPa to about 1000 MPa, and a $T_g$ greater than about 70° C. The Secondary Coating preferably has an elongation of from about 30% to about 80%. In addition, preferably the Secondary Coating shows a change in equilibrium modulus of about 20% or less when aged for 60 days at 85° C. and 85% relative humidity.

A Secondary Coating produced from the coating composition according to the invention will desirably have an oil sensitivity and/or water sensitivity suitable for coating optical fiber. Typically, the Secondary Coating will have an oil sensitivity of about 10% or less, and a water sensitivity of about 10% or less. Preferably, the Secondary Coating will have an oil sensitivity of about 5% or less, and a water sensitivity of about 5% or less.

The modulus, as is well known, is the rate of change of strain as a function of stress. This is represented graphically as the slope of the straight line portion of a stress-strain diagram. The modulus may be determined by use of any instrument suitable for providing a stress-strain curve of sample. Instruments suitable for this analysis include those manufactured by Instron, Inc., and include the Instron 5564.

In determining the modulus of the cured coating compositions in accordance with the invention, a sample of the radiation-curable composition is drawn onto a plate to provide a thin film, or alternatively formed into a rod using a cylindrical template. The sample is then exposed to radiation to affect cure. One (or more, if an average value is desired) film sample is cut from the cured film. The sample(s) should be free of significant defects, e.g., holes, jagged edges, substantial non-uniform thickness. Opposite ends of the sample are then attached to the instrument. During testing, a first end of the sample remains stationary, while the instrument moves the second end away from the first end at what may be referred to as a crosshead speed. The crosshead speed, which may initially be set at 1 inch/minute, may be altered if found to be inappropriate for a particular sample, e.g., a high modulus film breaks before an acceptable stress-strain curve is obtained. After setup is completed, the testing is then commenced, with the instrument providing a stress-strain curve, modulus and other data.

It is important to note that toughness can be measured in several ways. One way includes a tensile modulus of toughness that is based on the ability of material to absorb energy up to the point of rupture, and that is determined by measuring the area under the stress-strain curve. Another way to measure toughness is fracture toughness based on tear strength that requires starting with a pre-defined infinitely sharp crack of a certain length, and that uses a critical stress intensity factor resulting from the resistance of the material to crack propagation.

The invention will be further explained by way of the following examples, without being limited thereto

EXAMPLES

The abbreviations used in the examples which follow have the meanings described below:

A-189 denotes γ-mercaptopropyltrimethoxysilane
TDI denotes toluenediisocyanate
IPDI denotes isophorone diisocyanate
HHPA denotes hexahydrophthalic anhydride
MHHPA denotes methyl hexahydrophthalic anhydride
SA denotes succinic anhydride
PA denotes phthalic anhydride
MA denotes maleic anhydride
DDSA denotes dodecenyl succinic anhydride
OSA denotes octeneyl succinic anhydride
EPON825 denotes bisphenol A/ecpichlorohydrin
EPON828 denotes bisphenol A/epichlorohydrin
YD-126 denotes bisphenol A/epichlorohydrin
SynFac 8015 denotes propoxylated bisphenol A (15 mol PO)
Photomer 3016 denotes epoxy acrylate derived from bisphenol A diglycidyl ether and acrylate (TPGDA, TMPTO, or GPTA)
Cadura E-10 denotes versatic acid monoglycidyl ether
VAME denotes versatic acid monoglycidyl ether
12OH denotes 12-hydroxystearic acid
TEG denotes triethylene glycol
HEA denotes hydroxyethyl acrylate
PPA6 denotes polypropylene glycol monoacrylate
TPGMA denotes tripropylene glycol monoacrylate
TPGDA denotes tripropylene glycol diacrylate
SR-306 denotes tripropylene glycol diacrylate
SR-349 denotes ethoxylated bisphenol A diacrylate
SR-351 denotes trimethylol propane triacrylate
SR-444 denotes pentaerythritol triacrylate
SR-495 denotes polycaprolatone acrylate alcohol
SR-504 denotes ethoxylated nonyl phenol acrylate
Photomer 4003 G denotes ethoxylated nonylphenol acrylate
Photomer 4028 denotes ethoxylated bisphenol A diacrylate
Photomer 4061 denotes tripropylene glycol diacrylate
Photomer 4066 denotes ethoxylated nonylphenol acrylate
Photomer 4006 denotes trimethylol propane triacrylate Photomer 4072 denotes propoxylated trimethylolpropane triacrylate
CN-120Z denotes bisphenol A based epoxy diacrylate
Irgacure 819 denotes bis(2,4,6-trimethylbenzoyl)phenyl phosphine oxide
Irganox 1035 denotes thiodiethylene bis(3,5-di-tert-butyl-4-hydroxyhydrocinnamate)
Irgacure 184 denotes 1-hydroxycyclohexyl phenyl ketone
TPO denotes 2,4,6-trimethylbenzoyl diphenylphosphine oxide
TPP denotes triphenylphosphine
DABCO denotes 1,4-diazabicyclo[2.2.2]octane
DBTDL denotes dibutyl tin dilaurate
IPA denotes isophthalic acid
Pripol 1006 denotes a dicarboxylic dimer fatty acid
EMPOL 1004 denotes a hydrogenated dimer acid produced by the dimerization of $C_{18}$ is fatty acids
BHT denotes 2,6-di-tert-butyl-4-methylphenol
Tereflex 85 denotes polyester resin
Uralac P525 denotes carboxy terminated polyester
MP diol denotes 2-methyl-1,3-propanediol
P710 denotes polypropylene glycol (MW=700 g/mol)
P1010 denotes polypropylene glycol (MW=1000 g/mol)
P2010 denotes polypropylene glycol (MW=2000 g/mol)
P1044 denotes polypropylene glycol (MW=4000 g/mol)

Alpha Oligomer in accordance with the invention can be prepared, for example, using hexahydrophthlalic anhydride (HHPA) that has a melting/solidification point of 35° C., so it can be heated up in a hot box to make a liquid. The Alpha Oligomer can be prepared from a mixture of three monomers added in the following order: First, BHT (acrylate polymerization inhibitor), molten HHPA, and hydroxylethyl acrylate (1-EA) are combined and heated to a set point temperature of about 110° C. Second, after about one hour, when the acid value of the mixture is about 205 meq KOH, an epoxy-containing compound, EPON 825 (EPON), is added along with triphenylphosphine and DABCO catalysts. Finally, after about 10-14 hours, when the acid value of the mixture is less than 5.0 meq KOH, a product is recovered from the reaction. The reaction product is believed to have the following theoretical structure:

HEA-HHPA-EPON-HHPA-HEA.

The acid value (AV) is measured as follows: About 2 grams of sample is diluted in 50 mL acetone mixed with 50 ml isopropyl alcohol. The mixture is potentiometrically titrated with 0.1M potassium hydroxide in methanol standard solution (KOH/MeOH) after it is stirred for 5 minutes. Both acid values (AV1, for acids having a $pK_a \leq 2$, and AV2, for acids having a $pK_a > 2$) are automatically determined on Brinkmann 751 Tirino Titrator.

Other Alpha Oligomers in accordance with the invention can be prepared using extenders to change molecular weight. For example, the acrylate (e.g., HEA), the anhydride compound (e.g., HHPA), and/or 12-hydroxystearic acid (12OH) and/or polyol (e.g., polypropylene glycol or "PPG") can be combined in the reactor along with BHT as the acrylate polymerization inhibitor. Air is used as a purge to provide renewal for the BHT to maintain its activity as a polymerization inhibitor. The reaction mixture is heated slowly to 80° C., at which point a mild exothermic reaction begins to takes place as the anhydride opens up by reacting with the hydroxyl group of the HEA or the acid group of the 12-hydroxystearic acid to make acid terminated derivatives. Then the reaction is controlled by cooling and heating until it reaches a temperature of about 110° C. The reaction conditions are held constant for about one hour. When a polyol such as PPG is included in the mixture, one mole of the anhydride HPPA will react with each terminal hydroxyl group of the polypropylene glycol to make a di-acid terminated pre-oligomer. Next, a multifunctional epoxy is added to the mixture.

In the case of 12-hydroxystearic acid (12OH) derivative, the product desirably has the theoretical structure:

[HEA-HHPA]-EPON-[HHPA-12OH]-EPON-[HHPA-HEA]

In the case of the polypropylene glycol (PPG) derivative, the product contains a mixture of theoretical structures:

[HEA-HHPA]-EPON-[HHPA-HEA] and

[HEA-HHPA]-EPON-[HHPA-PPG-HHPA]-EPON-[HHPA-HEA]

In addition to using a diol as an extender, the glycidyl ester of neodecanoic acid (Cardura E10 sold by Hexion Speciality Chemicals, also referred to as versatic acid monoglycidyl ester or VAME) is used as an extender by including it in the reaction mixture. This makes the following derivative:

[HEA-HHPA-VAME-HHPA]-EPON-[HHPA-HEA]

and/or

[HEA-HHPA]-EPON-[HHPA-VAME-HHPA]-EPON-[HHPA-HEA]

Table 1a lists the wt. % amounts of anhydride, acrylate, epoxy 1, epoxy 2 (if present) extender (if present), catalyst 1, catalyst 2, and polymerization inhibitor used to prepare various Alpha Oligomers in accordance with the invention (formulations A-W) suitable for use in Secondary Coating compositions. In each case, the anhydride is HHPA, the acrylate is HEA, the epoxy 1 is EPON 825, the catalyst 1 is TTP, the catalyst 2 is DABCO, and the polymerization inhibitor is BHT unless otherwise indicated.

TABLE 1a

Alpha Oligomer Formulations for Secondary Coating Compositions

| Ex # | Anhydride (wt. %) | Acrylate (wt. %) | Epoxy 1 (wt. %) | Epoxy 2 (wt. %) | Extender (wt. %) | Catalyst 1 (wt. %) | Catalyst 2 (wt. %) | Inhibitor (wt. %) |
|---|---|---|---|---|---|---|---|---|
| A | 25.88 | 34.33 | 39.57 | — | — | 0.1 | 0.03 | 0.09 |
| B | 31.06 | 20.63 | 37.51 | VAME 3.39 | 12OH 7.22 | 0.09 | 0.02 | 0.08 |
| C | 29.3 | (PPA6) 20.03 | 33.86 | — | HEA 16.61 | 0.1 | 0.02 | 0.08 |
| D | 28.95 | 18.95 | 34.8 | Synfac 8015 17.13 | — | 0.08 | 0.02 | 0.07 |
| E | 30.6 | 20.04 | 35.3 | — | P1010 13.88 | 0.09 | 0.02 | 0.07 |

TABLE 1a-continued

Alpha Oligomer Formulations for Secondary Coating Compositions

| Ex # | Anhydride (wt. %) | Acrylate (wt. %) | Epoxy 1 (wt. %) | Epoxy 2 (wt. %) | Extender (wt. %) | Catalyst 1 (wt. %) | Catalyst 2 (wt. %) | Inhibitor (wt. %) |
|---|---|---|---|---|---|---|---|---|
| F | 35.09 | 20.4 | 40.4 | — | TEG 3.95 | 0.1 | 0.02 | 0.07 |
| G | 29.93 | 19.24 | 40.38 | — | 12OH 10.26 | 0.1 | 0.02 | 0.07 |
| H | 31.13 | 19.56 | 35.9 | — | P710 13.23 | 0.09 | 0.02 | 0.07 |
| I | 30.16 | 22.01 | 34.8 | — | P1044 12.84 | 0.09 | 0.02 | 0.08 |
| J | 32.64 | 21.43 | 32.72 | VAME 13.0 | — | 0.1 | 0.02 | 0.08 |
| K | 21.99 | 30.19 | 34.79 | — | P1044 12.82 | 0.1 | 0.02 | 0.09 |
| L | (SA) 21.3 | 22 | 45.5 | — | 12OH 11 | 0.09 | 0.02 | 0.09 |
| M | 18.08 | 13.68 | 21.48 | — | — | 0.07 | 0.02 | 0.05 |

Table 1b lists the wt. % amounts of isocyanate, acrylate, extender compound (if applicable), catalyst, and polymerization inhibitor used to prepare various conventional urethane-containing oligomer formulations (formulations AA-AI) suitable as Beta Oligomers for use in Secondary Coating compositions. In each case, the isocyanate is TDI, the acrylate is HEA, the catalyst is DBTDL, and the polymerization inhibitor is BHT unless otherwise indicated.

TABLE 1b

Beta Oligomer Formulations for Secondary Coating Compositions

| Ex # | Isocyanate (wt. %) | Acrylate 1 (wt. %) | Acrylate 2 (wt. %) | Extender (wt. %) | Catalyst (wt. %) | Inhibitor (wt. %) |
|---|---|---|---|---|---|---|
| AA | 30.8 | 24.7 | EPON 825/VAME 5.2/13.8 | 12OH 25.5 | (DABCO) 0.01 | 0.00 |
| AB | (IPDI/TDI) 9.41/2.95 | 3.93 | — | P2010 83.43 | 0.09 | 0.19 |
| AC | 6.51 | 2.99 | — | P1044 90.4 | 0.03 | 0.07 |
| AD | 3.95 | 2.76 | — | PPG8000 93.25 | 0.02 | 0.02 |
| AE | 4.29 | 1.33 | TPGMA* 50.0 | P1044 44.43 | 0.015 | 0.02 |
| AF | 2.789 | (TPGDA) 30.0 | CN120Z 30.0 | P1044 37.176 | 0.015 | 0.02 |
| AG | 4.39 | (TPGDA) 25.00 | SR-495 5.87 | P55-28 64.705 | 0.015 | 0.02 |
| AH | 18.8 | 15.0 | SR-504 13.8 | PTGL1000 43.7 | TPO/DABCO 2.2/0.04 | 0.08 |
| AI | 21.33 | 14.22 | — | P1010 64.35 | 0.015 | 0.05 |

*includes some TPGDA reactive diluent

Coating compositions comprising the Alpha Oligomers and Beta Oligomers described above are prepared in accordance with the following example. For a total batch size of 50 g, 25 g of the Alpha Oligomer formulation A, 7.5 g urethane containing Beta Oligomer formulation AC, and 15.5 g SR-306 diluent (i.e., tripropylene glycol diacrylate) are weighed out and placed in a 100 g can. The mixture is heated in a forced air oven at 80° C. with periodic hand stirring until the mixture is homogeneous. Then the mixture is allowed to cool to below 70° C. at which point the following powders are added: 1.5 g Irgacure 184 photoinitiator, 0.25 g Chivacure TPO photoinitiator, and 0.25 g Irgacure 1035 stabilizer. The resulting mixture is mechanically stirred for one hour at 275 rpm on a hot plate with a controlled liquid temperature of 70° C. The reaction mixture is covered with aluminum foil to keep out stray light.

Table 2a lists the components of Secondary Coating formulations (coatings 1-13) comprising an Alpha Oligomer of the invention in the absence of Beta Oligomer or Gamma Oligomer. The Alpha Oligomers are those listed in Table 1a and are prepared in accordance with the foregoing method.

TABLE 2a

Coating Formulations for Secondary Coatings

| Coating # | Alpha Oligomer (wt. %) | Diluent 1 (wt. %) | Diluent 2 (wt. %) | Stabilizer (wt. %) | Photo-initiator (wt. %) |
|---|---|---|---|---|---|
| 1 | A 60 | TPGDA 36 | — | Irg 1035 0.5 | Irg 184/TPO 3/0.5 |
| 2 | B 60 | TPGDA 31 | Ph 4003 g 5 | Irg 1035 0.5 | Irg 184/TPO 3/0.5 |
| 3 | C 60 | TPGDA 31 | Ph 4003 g 5 | Irg 1035 0.5 | Irg 184/TPO 3/0.5 |
| 4 | D 60 | TPGDA 33.5 | Ph 3016 2.5 | Irg 1035 0.5 | Irg 184/TPO 3/0.5 |

TABLE 2a-continued

Coating Formulations for Secondary Coatings

| Coating # | Alpha Oligomer (wt. %) | Diluent 1 (wt. %) | Diluent 2 (wt. %) | Stabilizer (wt. %) | Photo-initiator (wt. %) |
|---|---|---|---|---|---|
| 5 | D 60 | TPGDA 36 | — | Irg 1035 0.5 | Irg 184/TPO 3/0.5 |
| 6 | E 60 | TPGDA 33.5 | Ph 3016 2.5 | Irg 1035 0.5 | Irg 184/TPO 3/0.5 |
| 7 | F 60 | TPGDA 36 | — | Irg 1035 0.5 | Irg 184/TPO 3/0.5 |
| 8 | G 60 | TPGDA 36 | — | Irg 1035 0.5 | Irg 184/TPO 3/0.5 |
| 9 | H 60 | TPGDA 31 | Ph 4003 g 5 | Irg 1035 0.5 | Irg 184/TPO 3/0.5 |
| 10 | I 60 | TPGDA 31 | Ph 4003 g 5 | Irg 1035 0.5 | Irg 184/TPO 3/0.5 |
| 11 | J 64 | TPGDA 27 | Ph 4003 g 5 | Irg 1035 0.5 | Irg 184/TPO 3/0.5 |
| 12 | K 60 | TPGDA 31 | Ph 4003 g 5 | Irg 1035 0.5 | Irg 184/TPO 3/0.5 |
| 13 | L 64 | TPGDA 27 | Ph 4003 g 5 | Irg 1035 0.5 | Irg 184/TPO 3/0.5 |
| 14 | M 62.5 | TPGDA 28.5 | SR-351 5 | Irg 1035 0.5 | Irg 184/TPO 3/0.5 |

Table 2b lists the components of Secondary Coating formulations (coatings 14-22) comprising blends of Alpha Oligomer and Beta Oligomer of the invention listed in Tables 1a and 1b and prepared in accordance with the foregoing method.

TABLE 2b

Coating Formulations for Secondary Coatings

| Coating # | Alpha Oligomer (wt. %) | Beta Oligomer (wt. %) | Gamma Oligomer (wt. %) | Diluent (wt. %) | Stabilizer (wt. %) | Photoinitiator (wt. %) |
|---|---|---|---|---|---|---|
| 15 | A 48 | AB 20 | — | TPGDA 28.8 | Irg 1035 0.4 | Irg 184/TPO 2.4/0.4 |
| 16 | A 51 | AB 15 | — | TPGDA 30 | Irg 1035 0.5 | Irg 184/TPO 3/0.5 |
| 17 | A 61.25 | AB 14 | — | TPGDA 20.75 | Irg 1035 0.5 | Irg 184/TPO 3/0.5 |
| 18 | A 49.6 | AC 15 | — | TPGDA 31.4 | Irg 1035 0.5 | Irg 184/TPO 0.3/0.5 |
| 19 | A 49.6 | AD 15 | — | TPGDA 31.4 | Irg 1035 0.5 | Irg 184/TPO 3/0.5 |
| 20 | A 50.00 | AC 30.0 | — | TPGDA 16.0 | Irg 1035 0.5 | Irg 184/TPO 3/0.5 |
| 21 | A 42.11 | AF 31.39 | — | TPGDA 22.5 | Irg 1035 0.5 | Irg 184/TPO 3/0.5 |
| 22 | A 43.6 | AG 17.5 | CN-120Z 7.5 | TPGDA 27.4 | Irg 1035 0.5 | Irg 184/TPO 3/0.5 |
| 23 | M 37.34 | AI 23.91 | CN-120Z 22.91 | TPGDA 11.46 | Irg 1035 0.5 | Irg 184/TPO 2.75/0.76 |

Table 2c lists the components of comparative Secondary Coating formulations (coatings 23-28) comprising no Alpha Oligomer and only conventional urethane-containing Beta Oligomer listed in Table 1b or other components as indicated.

TABLE 2c

Comparative Coating Formulations for Secondary Coatings

| Coating # | Beta Oligomer (wt. %) | Diluent 1 (wt. %) | Diluent 2 (wt. %) | Stabilizer (wt. %) | Photoinitiator (wt. %) |
|---|---|---|---|---|---|
| 24 (comparative example) | AA 60 | TPGDA 36 | — | Irg 1035 0.5 | Irg 184/TPO 3/0.5 |
| 25 (comparative example) | AB 55 | Ph 4003 g 42.5 | — | Irg 1035 0.5 | A-189/Irg 819 0.9/1.1 |
| 26 (comparative Example) | — | Ph 4028 77 | Ph 3016 20 | Irg 1035 0.5 | Irg 184/Irg 819 1.5/1.5 |
| 27 (comparative example) | SR-444 39.9 | Ph 4028 37.1 | Ph 3016 20 | Irg 1035 0.5 | Irg 184/Irg 819 1.5/1.5 |
| 28 (comparative example) | AH 44 | SR-349 56 | — | Irg 1035 1.2 | Irg 184 4.9 |

Comparative examples 26 and 27 shown in Table 3 are prepared according to test coatings 1 and 10, respectively, provided in Table 1, col. 20, of U.S. Pat. No. 6,707,977 B2, which are prepared using commercially available materials. Comparative example 27 comprises SR-444, which is pentacrythritol triacrylate sold by Sartomer Co. Comparative example 28 is prepared with an oligomer based on comparative example AH that contains the cure package materials, as listed in Table 1a. The Secondary Coating compositions shown above in Tables 2a-2c are tested for various physical properties after cure including the elastic modulus, tensile strength, elongation, tensile modulus, and oil and water sensitivity.

Test Methods
Elastic Modulus:

The Elastic Modulus is determined by dynamic mechanical analysis (DMA). Elastic storage modulus (E'), viscous loss modulus (E"), and tan delta (E"/E') are measured by conventional DMA methods. A free film specimen of cured material is cut to size (about 35 mm length), measured for width and thickness and mounted. The environmental chamber containing the sample is brought to 80° C. The sample is stretched before temperature sweep is started. The temperature is lowered in prescribed steps to the starting temperature. The temperature sweep is started and allowed to proceed upwards on the temperature scale until the material is beyond the glass transition range and well into the rubbery range. The DMA instrument (Rheometrics Solids Analyzer, RSA-II equipped with a personal computer) produced a plot of the data on the computer screen. The temperature at which E' is 1,000 MPa and E' is 100 MPa is calculated from this plot, as well as the tan $\delta_{max}$. The minimum value of E' attained in the rubbery region is measured and reported in Table 3 as the equilibrium modulus or rubbery modulus. Additional test samples prepared in the same manner are subjected to aging in a controlled chamber maintained at 85° C. and 85% relative humidity. After 60 days of aging under these conditions, a set of test samples is removed and tested in accordance with the above dynamic mechanical analysis procedures, and an equilibrium modulus determined. This value is compared to the equilibrium modulus prior to aging and the result is reported as the percent equilibrium modulus loss or change after 60 days aging relative to the initial value.

The elastic modulus data for cured Secondary Coating compositions comprising Alpha Oligomer of the invention alone (coatings 1-14), Alpha Oligomer in combination with Beta Oligomer (coatings 15-23) and comparative Secondary Coating compositions comprising conventional urethane oligomers (coatings 24-28) are reported in Table 3.

TABLE 3

Elastic Modulus Data for Cured Secondary Coating Compositions

| Coating # | Temp. (° C.) @ E' = 1000 MPa | Temp. (° C.) @ E' = 100 MPa | Temp. (° C.) @ Tan $\delta_{max}$ ($T_g$) | Eq. Modulus (MPa) | Eq. Modulus change (%) |
|---|---|---|---|---|---|
| 1 | 63.2 | 76.8 | 72.3 | 41.1 | −12.9 |
| 2 | 41.7 | 55.9 | 56.0 | 25.3 | −9.0 |
| 3 | 35.8 | 56.8 | 56.8 | 29.7 | — |
| 4 | 37.3 | 60.2 | 60.2 | 27.5 | — |
| 5 | 42.4 | 59.7 | 58.2 | 34 | — |
| 6 | 39.2 | 63.4 | 61.8 | 30.4 | — |
| 7 | — | — | — | — | — |
| 8 | 37.9 | 59.9 | 60 | 28.6 | — |
| 9 | — | — | — | — | — |
| 10 | 42.9 | 62.8 | 62.8 | 26.7 | — |
| 11 | 44.8 | 64.9 | 65.0 | 25.1 | — |
| 12 | 36.9 | 51.1 | 51.2 | 24.2 | — |
| 13 | 45.3 | 26.5 | 65.1 | 26.6 | −13.6 |
| 14 | 41.2 | 59.7 | 53.9 | 40.1 | — |
| 15 | 38.9 | 60.6 | 60.7 | 26.0 | −9.1 |
| 16 | 41.2 | 69.1 | 69.1 | 26.3 | — |
| 17 | 41.2 | 71.2 | 69.1 | 26.7 | +3.7 |
| 18 | 52.2 | 77.5 | 77.3 | 29.1 | −18.6 |
| 19 | 45.2 | 77.6 | 77.6 | 26.4 | — |
| 20 | 53.9 | 82.5 | 83.5 | 30.0 | −10.1 |
| 21 | 50.1 | 76.2 | 75.5 | 35.2 | — |
| 22 | 51.6 | 78.9 | 77.6 | 32.9 | — |
| 23 | 47.5 | 80.6 | 76.8 | 39.2 | −9.6 |
| 24 (comparative example) | 45.6 | 88.2 | 84.1 | 37.0 | — |
| 25 (comparative example) | — | — | — | — | — |
| 26 (comparative example) | — | — | — | — | — |
| 27 (comparative example) | — | — | — | — | — |
| 28 (comparative example) | 29.7 | 83.8 | 83 | 39.2 | −9.0 |

The results shown in Table 3 illustrate that coating compositions prepared with Alpha Oligomer of the invention have a $T_g$ and % change in equilibrium modulus after aging that is comparable to coating compositions comprising urethane oligomers. All of the Secondary Coatings of the invention (coatings 1-23) are shown to have a $T_g$ greater than 50° C. These coatings also show very good hydrolytic stability compared to the comparative experiments in terms of the percent change in the equilibrium modulus after aging.

Tensile Strength, Elongation and Modulus Test Methods:

The tensile properties of Radiation Curable Secondary Coatings for Optical Fiber are tested on films using a universal testing instrument, Instron Model 4201 equipped with a suitable personal computer and Instron software to yield values of tensile strength, percent elongation at break, and secant or segment modulus. Load cells have 2 or 20 pound capacity, or metric equivalents. To prepare the samples for testing, a drawdown (cured film) of each material to be tested is made on a glass plate and cured using a UV processor. The cured film is conditioned at 23±2° C. and 50±5% relative humidity for a minimum of sixteen hours prior to testing. A minimum of eight test specimens, having a width of 0.5±0.002 inches and a length of 5 inches, are cut from the cured film. To minimize the effects of minor sample defects, sample specimens are cut parallel to the direction in which the drawdown of the cured film was prepared. If the cured film is tacky to the touch, a small amount of talc is applied to the film surface using a cotton tipped applicator.

The test specimens are then removed from the substrate. Caution is exercised so that the test specimens are not stretched past their elastic limit during the removal from the substrate. If any noticeable change in sample length has taken place during removal from the substrate, the test specimen is discarded. If the top surface of the film is talc coated to eliminate tackiness, then a small amount of talc is applied to the bottom surface of test specimen after removal from the substrate.

The average film thickness of the test specimens is determined with a micrometer. At least five measurements of film thickness were made in the area to be tested (from top to bottom) and the average value used for calculations. If any of the measured values of film thickness deviated from the average by more than 10% relative, the test specimen is discarded. Film width is also measured. All specimens came from the same plate, and generally, at least six strips are needed to obtain tensile properties. After calibration and standardization, each test specimen is tested by suspending it into the space between the upper pneumatic grips such that the test specimen is centered laterally and hanging vertically. The upper grip (only) is locked. The lower end of the test specimen is pulled gently so that it has no slack or buckling, and it is centered laterally in the space between the open lower grips. While holding the specimen in this position, the lower grip is locked.

The sample number and sample dimensions are entered into the data system, following the instructions provided by the software package. Tensile measurement for the sample is then executed with the Instron device. This is repeated for additional specimens. The temperature and humidity are measured after the last test specimen from the current drawdown is tested. The calculation of tensile properties is performed automatically by the software package. The values for tensile strength, % elongation, and secant modulus are checked to determine whether any one of them deviated from the average enough to be an "outlier." If necessary, the procedure is repeated. A measure of toughness is calculated based on the ability of material to absorb energy up to the point of rupture, and that is determined by measuring the area under the stress-strain curve.

The tensile properties of cured Secondary Coatings are tested on rods following the method described in U.S. Pat. No. 6,862,392, which is incorporated herein by reference. The rods are prepared by filling elastomeric clear silicone rubber tubing with the coating composition and using a Fusion UV processor. The set-up of the Fusion UV processor is as follows:
Lamps: D
Intensity 120 W/cm
Intensity meter IL390
Dose 1.0 J/cm²
Atmosphere Nitrogen
Conditioning time in 50% humidity 16-24 hours
exposing the composition to one Joule of UV radiation from a D lamp under nitrogen purge.

If the tubes are rotated 180°, then it is not required that the tubes be cured on aluminum foil. If the tubes are not rotated 180°, then the tubes are to be cured on aluminum foil.

The rods are recovered from the tubing by gently stretching the tube from the end of the rod and cutting the empty portion of the tube with a razor blade. The end of the rod is then grasped using forceps and the tubing was slowly pulled off of the rod.

The tensile strength, elongation, tensile modulus, toughness, $E_{max}$, and viscosity for Secondary Coating compositions comprising Alpha Oligomer of the invention alone (coatings 1-14), Alpha Oligomer of the invention in combination with Beta Oligomer (coatings 15-23) and comparative Secondary Coating compositions comprising conventional urethane oligomers (coatings 24-28) are reported in Table 4.

TABLE 4

Tensile Data for Cured Secondary Coating Compositions

| Coating # | Tensile (MPa) | Elongation (%) | Modulus (MPa) | Toughness (J/m³) | $E_{max}$ (%) | Viscosity (mPa·s) |
|---|---|---|---|---|---|---|
| 1 | 63.3 | 37 | 1872 | 18.8 | 45.2 | 5831 |
| 2 | 61.8 | 47.5 | 1478 | 21 | 58.9 | 6681 |
| 3 | 49.3 | 36.3 | 1127.3 | 13.6 | 46 | 4624 |
| 4 | 43 | 39.6 | 1051 | 13.6 | 49.6 | 7423 |
| 5 | 51.1 | 38.5 | 1212.3 | 15.52 | 52 | 3182 |
| 6 | 44.2 | 39.8 | 1058.5 | 13.9 | 49.7 | 6393 |
| 7 | 62 | 5.7 | 1905 | 2.5 | 40.3 | NA |
| 8 | 47.5 | 43 | 1242 | 15.9 | 52.3 | 4873 |
| 9 | 38.9 | 35.2 | 919.3 | 10.9 | 48.5 | 5727 |
| 10 | 41.3 | 38.4 | 1260 | 13.1 | 48.1 | 4459 |
| 11 | 41.8 | 43 | 1288 | 15.1 | 50 | 7152 |
| 12 | 45 | 36.4 | 1325 | 13.7 | 52 | 3522 |
| 13 | 42 | 43 | 1288 | 15 | 50 | 7152 |
| 14 | 48 | 30 | 1193 | 12 | 39 | 7519 |
| 15 | 45.2 | 38.3 | 1118 | 13.3 | 60.5 | 9066 |
| 16 | 43.7 | 39.7 | 1073 | 13.7 | 53 | 9421 |
| 17 | 56.9 | 63.4 | 1093.7 | 23.5 | 72.4 | 7462 |
| 18 | 58.7 | 59.3 | 1036.8 | 15.0 | 77 | 6951 |
| 19 | 43.5 | 33.8 | 1103.6 | 11.8 | 56 | 6465 |
| 20 | 49.1 | 32.6 | 1232.5 | 13.0 | 52.1 | 9693 |
| 21 | 50.4 | 40.4 | 1135 | 16.2 | 498.2 | 6885 |
| 22 | 41.0 | 42.3 | 1018 | 14.7 | 49.4 | 6942 |
| 23 | 59.0 | 47.3 | 1047.2 | 21.0 | 56.3 | 6797 |
| 24 (comparative example) | 47.8 | 31.5 | 1203 | 12.8 | 34 | 6751 |
| 25 (comparative example) | NA | NA | NA | NA | NA | NA |
| 26 (comparative example) | 66.5 | 19.8 | 1899.4 | 11.3 | 31.0 | 2531 |
| 27 (comparative example) | 87.6 | 8.3 | 2206.2 | 5.3 | 11.6 | 1980 |
| 28 (comparative example) | 51.9 | 38 | 945 | 13.9 | — | 5800 |

The results shown in Table 4 illustrate that coating compositions prepared with Alpha Oligomer of the invention have a toughness, a secant modulus, and an elongation that is comparable to coating compositions comprising urethane oligomers. Nearly all of the Secondary Coatings of the invention are shown to have a toughness greater than 12 J/m², a secant modulus less than 1500 MPa, and an elongation between 30-80%.

Method for Determining Dynamic Oil Sensitivity of UV-Cured Materials.

The oil sensitivity for each sample is determined using ASTM D 570 (Standard Test Method for Water Absorption of Plastics), which describes a procedure for determining the maximum oil absorption and total amount of oil extractable material of UV-cured coatings, as well as a procedure for determining the dimensional changes in UV cured coatings when exposed to oil. The samples are prepared by (1) preparing one draw-down per material to be tested at a film thickness of 150 microns (6 mils), (2) curing the film at 1.0 J/cm² exposure using a Fusion D bulb and nitrogen inerting; (3) cutting three sample specimens in the cured film, approximately 7.5 cm×3.8 cm, using a single edge razor blade; (4) cutting a small notch, approximately 2 mm×2 mm, in one corner of each specimen so that dimensional changes can be made on the same sides throughout the duration of the experiment; (5) placing a glass plate containing the three sample specimens in a 60° C. oven (capable of maintaining 60° C.±3° C.) for one hour; (6) removing the glass plate and samples from the oven and place them in a desiccator (capable of maintaining ≤20% R.H.) for 15 minutes; and (7) recording the relative humidity of the desiccator. The oil sensitivity of each sample is determined by (1) placing 125 ml (4 oz.) of a light, white mineral oil into each of three Pyrex petri dishes (100 mm×20 mm with Pyrex cover lids), maintaining a temperature to 23±2° C.; (2) measuring the length and width of each of the specimens to the nearest 0.1 mm using a ruler marked in increments of 1 mm; (3) weighing each of the sample specimens to the nearest 0.1 mg on an analytical balance (having 0.1 mg accuracy) using corrugated Teflon paper to prevent sticking; (4) placing each specimen into one of the petri dishes of cabling gel; (5) after 30 minutes have elapsed, removing the samples one at a time using the forceps (approximately 15-20 cm long) and blotting them on the wiping tissue (absorbent, low-lint wiping tissue); (6) remeasuring the length and width of the samples; (7) reweighing the samples and placing them back into their respective petri dishes. The steps of removing, measuring and weighing the samples as described above at 1, 3, 6 was repeated after 24 hours, 7 days and 14 days. After 21 days, the samples are re-measured and re-weighed and placed onto a glass plate and into the 60° C. oven for one hour. The samples are then removed from the oven and placed in the desiccator for 15 minutes after which time the relative humidity is recorded and the samples are measured and weighed as before. The percent weight change and percent dimensional change at each time interval is determined and each set of values is averaged. The maximum oil absorption is the largest, positive average percent weight change. The percent oil extractables for each sample is determined by dividing the difference of the initial and 21-day dried weights by the initial dried weight and multiplying by 100. The total oil sensitivity is the sum of the absolute values of the maximum oil absorption and the percent cabling gel extractables.

maintaining a temperature to 23±2° C.; (2) weighing each of the sample specimens on an analytical balance (capable of reading 0.0001 g) using corrugated Teflon paper to prevent sticking, and place each specimen into one of the jars of water; (3) after 30 minutes elapsed, removing the samples one at a time using forceps (approximately 15-20 cm long) and blotting them on the wiping tissue (absorbent, low-lint wiping tissue); (4) re-weighing the samples as above and placing them back into their respective jars; (5) repeating the steps of removing and re-weighing the samples at 1, 2, 6, and 24 hours, and 7 and 14 days; (6) at 21 days, reweighing the samples as above and place them onto a glass plate and into the 60° C. oven for one hour; (7) removing the samples from the oven and place them in the desiccator for 15 minutes; and (8) recording the desiccator R.H. and temperature and reweigh the samples as before. The percent weight change at each time interval is determined and the values are averaged. The maximum water absorption is the largest, positive average percent weight change. The percent water extractables for each sample is determined by dividing the difference of the initial and 21-day dried weights by the initial dried weight and multiplying by 100. The total water sensitivity is the sum of the absolute values of the maximum water absorption and the percent water extractables The oil and water sensitivity data for several cured Secondary Coating compositions of the invention (coatings 1, 2, 14, 18, and 23) and comparative coating compositions (coatings 28 and DS2002) are shown in Table 5.

TABLE 5

Water and Oil Sensitivity Data for Cured Secondary Coatings

| Coating # | Max. Oil Absorption | % Oil Extractable | Total Oil Sensitivity | Max. $H_2O$ Absorption | % $H_2O$ Extractable | Total $H_2O$ Sensitivity |
|---|---|---|---|---|---|---|
| 1 | 0.908 | 0.00142 | 0.910 | 2.134 | 0.0751 | 2.209 |
| 2 | 0.898 | 0.239 | 1.137 | 2.445 | 0.276 | 2.720 |
| 14 | 1.602 | 0.121 | 1.723 | 2.456 | 0.361 | 2.818 |
| 18 | 0.846 | 1.67 | 2.519 | 2.246 | 1.723 | 3.969 |
| 23 | 0.907 | 0.0543 | 0.961 | 2.726 | 0.4901 | 3.217 |
| 28 (comparative example) | 1.020 | 0.0946 | 1.115 | 1.107 | 0.665 | 1.772 |
| (comparative example) | 0.900 | 0.00488 | 0.905 | 1.808 | 0.0268 | 1.835 |

Method for Determining Dynamic Water Sensitivity of UV-Cured Materials:

The dynamic water sensitivity for each sample is determined using ASTM D 570-81 (Standard Test Method for Water Absorption of Plastics), which describes a procedure for determining the maximum water absorption and total amount of water-extractable material of UV-cured coatings. The samples are prepared by (1) preparing one draw-down per material to be tested at a film thickness of 150 microns (6 mils); (2) curing the film at a 1.0 J/cm$^2$ exposure using a Fusion D bulb and nitrogen inerting; (3) cutting three, approximately 3 cm×3 cm, sample specimens in the cured film using a single edge razor blade; (4) placing the glass plate containing the three sample specimens in the 60° C. oven (capable of maintaining 60°±3° C.) for one hour; (5) removing the glass plate and samples from the oven and place them in a desiccator (capable of maintaining ≤20% R.H.) for 15 minutes; and (6) recording the relative humidity and temperature of the desiccator. The dynamic water sensitivity is determined by (1) placing 125 ml (4 oz.) of deionized or distilled water into 125 ml (4 oz.) glass jars with screw-top lids, Draw Tower Simulator In the early years of optical fiber coating developments, all newly developed primary and Secondary Coatings were first tested for their cured film properties and then submitted for evaluation on fiber drawing towers. Out of all the coatings that were requested to be drawn, it was estimated that at most 30% of them were tested on the draw tower, due to high cost and scheduling difficulties. The time from when the coating was first formulated to the time of being applied to glass fiber was typically about 6 months, which greatly slowed the product development cycle.

It is known in the art of radiation cured coatings for optical fiber that when either the Primary Coating or the Secondary Coating was applied to glass fiber, its properties often differ from the flat film properties of a cured film of the same coating. This is believed to be because the coating on fiber and the coating flat film have differences in sample size, geometry, UV intensity exposure, acquired UV total exposure, processing speed, temperature of the substrate, curing temperature, and possibly nitrogen inerting conditions.

Equipment that would provide similar curing conditions as those present at fiber manufacturers, in order to enable a more reliable coating development route and faster turnaround time has been developed. This type of alternative application and curing equipment needed to be easy to use, low maintenance, and offer reproducible performance. The name of the equipment is a "draw tower simulator" hereinafter abbreviated "DTS". Draw tower simulators are custom designed and constructed based on detailed examination of actual glass fiber draw tower components. All the measurements (lamp positions, distance between coating stages, gaps between coating stages and UV lamps, etc) are duplicated from glass fiber drawing towers. This helps mimic the processing conditions used in fiber drawing industry.

One known DTS is equipped with five Fusion F600 lamps—two for the upper coating stage and three for the lower. The second lamp in each stage can be rotated at various angles between 15-135°, allowing for a more detailed study of the curing profile.

The "core" used for the known DTS is 130.0±1.0 μm stainless steel wire. Fiber drawing applicators of different designs, from different suppliers, are available for evaluation. This configuration allows the application of optical fiber coatings at similar conditions that actually exist at industry production sites.

The draw tower simulator has already been used to expand the analysis of radiation curable coatings on optical fiber. A method of measuring the Primary Coating's in-situ modulus that can be used to indicate the coating's strength, degree of cure, and the fiber's performance under different environments in 2003 was reported by P. A. M. Steeman, J. J. M. Slot, H. G. H. van Melick, A. A. F. v.d. Ven, H. Cao, and R. Johnson, in the Proceedings of the 52nd IWCS, p. 246 (2003). In 2004, Steeman et al reported on how the rheological high shear profile of optical fiber coatings can be used to predict the coatings' processability at faster drawing speeds P. A. M. Steeman, W. Zoetelief, H. Cao, and M. Bulters, Proceedings of the 53rd IWCS, p. 532 (2004). The draw tower simulator can be used to investigate further the properties of primary and Secondary Coatings on an optical fiber.

These test methods are useful for Secondary Coatings on wire or coatings on optical fiber:

% RAU Secondary Test Method:

The degree of cure on the outer coating on an optical fiber is determined by FTIR using a diamond ATR accessory. FTIR instrument parameters include: 100 co-added scans, 4 cm$^{-1}$ resolution, DTGS detector, a spectrum range of 4000-650 cm$^{-1}$, and an approximately 25% reduction in the default mirror velocity to improve signal-to-noise. Two spectra are required; one of the uncured liquid coating that corresponds to the coating on the fiber and one of the outer coating on the fiber. The spectrum of the liquid coating is obtained after completely covering the diamond surface with the coating. The liquid should be the same batch that is used to coat the fiber if possible, but the minimum requirement is that it must be the same formulation. The final format of the spectrum should be in absorbance.

The fiber is mounted on the diamond and sufficient pressure is put on the fiber to obtain a spectrum suitable for quantitative analysis. For maximum spectral intensity, the fiber should be placed on the center of the diamond parallel to the direction of the infrared beam. If insufficient intensity is obtained with a single fiber, 2-3 fibers may be placed on the diamond parallel to each other and as close as possible. The final format of the spectrum should be in absorbance.

For both the liquid and the cured coating, measure the peak area of both the acrylate double bond peak at 810 cm$^{-1}$ and a reference peak in the 750-780 cm$^{-1}$ region. Peak area is determined using the baseline technique where a baseline is chosen to be tangent to absorbance minima on either side of the peak. The area under the peak and above the baseline is then determined. The integration limits for the liquid and the cured sample are not identical but are similar, especially for the reference peak.

The ratio of the acrylate peak area to the reference peak area is determined for both the liquid and the cured sample. Degree of cure, expressed as percent reacted acrylate unsaturation (% RAU), is calculated from the equation below:

$$\% RAU = \frac{(R_L - R_F) \times 100}{R_L}$$

where $R_L$ is the area ratio of the liquid sample and $R_F$ is the area ratio of the cured outer coating.

In-Situ Modulus of Secondary Coating Test Method:

The in-situ modulus of a Secondary Coating on a dual-coated (soft Primary Coating and hard Secondary Coating) glass fiber or a metal wire fiber is measured by this test method. For sample preparation, strip ~2 cm length of the coating layers off the fiber as a complete coating tube from one end of the coated fiber by first dipping the coated fiber end along with the stripping tool in liquid $N_2$ for at least 10 seconds and then strip the coating tube off with a fast motion while the coating layers are still rigid. A DMA (Dynamic Mechanical Analysis) instrument: Rheometrics Solids Analyzer (RSA-II) is used to measure the modulus of the Secondary Coating. For dual-coated fiber, Secondary Coating has much higher modulus than the Primary Coating; therefore the contribution from the Primary Coating on the dynamic tensile test results performed on the coating tube can be ignored. For RSA-II where the distance adjustment between the two grips is limited, the coating tube sample may be shorter than the distance between the two grips. A simple sample holder made by a metal plate folded and tightened at the open end by a screw is used to tightly hold the coating tube sample from the lower end. Slide the fixture into the center of the lower grip and tighten the grip. Using tweezers to straighten the coating tube to upright position through the upper grip. Close and tighten the upper grip. Adjust the strain offset until the pretension is ~10 g.

The tests are conducted at room temperature (~23° C.). Under the dynamic tensile test mode of DMA, the test frequency is set at 1.0 radian/second; the strain is 5E-4. The geometry type is selected as cylindrical. The sample length is the length of the coating tube between the upper edge of the metal fixture and the lower grip, 11 mm in our test. The diameter (D) is entered to be 0.16 mm according to the following equation:

$$D = 2 \times \sqrt{R_s^2 - R_p^2}$$

where $R_s$ and $R_p$ are secondary and Primary Coating outer radius respectively. The geometry of a standard fiber, $R_s$=122.5 μm and $R_p$=92.5 μm, is used for the calculation. A dynamic time sweep is run and 5 data points of tensile storage modulus E are recorded. The reported E is the average of all data points. This measured modulus E is then corrected by multiplying a correction factor which used the actual fiber geometry. The correction factor is $(122.5^2 - 92.5^2)/(R_s^{actual} - R_p^{actual})$. For glass fibers, actual fiber geometry including $R_s$ and $R_p$ values is measured by PK2400 Fiber Geometry System. For wire fibers, $R_s$ and $R_p$ are measured under microscope. The reported E is the average of three test samples.

In-Situ $T_g$ Measurement of Primary and Secondary Coatings Test Method:

The glass transition temperatures ($T_g$) of primary and Secondary Coatings on a dual-coated glass fiber or a metal wire fiber are measured by this method. These glass transition temperatures are referred to as "Tube Tg".

For sample preparation, strip ~2 cm length of the coating layers off the fiber as a complete coating tube from one end of the coated fiber by first dipping the coated fiber end along with the stripping tool in liquid $N_2$ for at least 10 seconds and then strip the coating tube off with a fast motion while the coating layers are still rigid.

A DMA (Dynamic Mechanical Analysis) instrument: Rheometrics Solids Analyzer (RSA-II) is used. For RSA-II, the gap between the two grips of RSAII can be expanded as much as 1 mm. The gap is first adjusted to the minimum level by adjusting strain offset. A simple sample holder made by a metal plate folded and tightened at the open end by a screw is used to tightly hold the coating tube sample from the lower end. Slide the fixture into the center of the lower grip and tighten the grip. Using tweezers to straighten the coating tube to upright position through the upper grip. Close and tighten the upper grip. Close the oven and set the oven temperature to a value higher than the $T_g$ for Secondary Coating or 100° C. with liquid nitrogen as temperature control medium. When the oven temperature reached that temperature, the strain offset is adjusted until the pretension was in the range of 0 g to 0.3 g.

Under the dynamic temperature step test of DMA, the test frequency is set at 1.0 radian/second; the strain is 5E-3; the temperature increment is 2° C. and the soak time is 10 seconds. The geometry type is selected as cylindrical. The geometry setting was the same as the one used for secondary in-situ modulus test. The sample length is the length of the coating tube between the upper edge of the metal fixture and the lower grip, 11 mm in our test. The diameter (D) is entered to be 0.16 mm according to the following equation:

$$D = 2 \times \sqrt{R_s^2 - R_p^2}$$

where $R_s$ and $R_p$ are secondary and Primary Coating outer radius respectively. The geometry of a standard fiber, $R_s$=122.5 μm and $R_p$=92.5 μm, is used for the calculation.

A dynamic temperature step test is run from the starting temperature (100° C. in our test) till the temperature below the Primary Coating $T_g$ or −80° C. After the run, the peaks from tan δ curve are reported as Primary Coating $T_g$ (corresponding to the lower temperature) and Secondary Coating $T_g$ (corresponding to the higher temperature). Note that the measured glass transition temperatures, especially for primary glass transition temperature, should be considered as relative values of glass transition temperatures for the coating layers on fiber due to the tan δ shift from the complex structure of the coating tube.

Draw Tower Simulator Examples

A commercially available radiation curable Primary Coating is located. As previously disclosed, the radiation curable Primary Coating may be any commercially available radiation curable Primary Coating for optical fiber. Such commercially available radiation curable Primary Coatings are available from DSM Desotech Inc., and others, including, but without being limited to Hexion, Luvantix and PhiChem.

The commercially available Primary Coating and various embodiments of the instant claimed Secondary Coating are applied to wire using a Draw Tower Simulator. The wire is run at five different line speeds, 750 meters/minute, 1200 meters/minute, 1500 meters/minute, 1800 meters/minute and 2100 meters/minute.

Drawing is carried out using either wet on dry or wet on wet mode. Wet on dry mode means the liquid Primary Coating is applied wet, and then the liquid Primary Coating is cured to a solid layer on the wire. After the Primary Coating is cured, the Secondary Coating is applied and then cured as well. Wet on wet mode means the liquid Primary Coating is applied wet, then the Secondary Coating is applied wet and then both the Primary Coating and Secondary Coatings are cured.

Multiple runs are conducted with a commercially available radiation curable Primary Coating and compositions of the instant claimed Secondary Coating. Set-up conditions for the Draw Tower Simulator:

Zeidl dies are used. S99 for the 1° and S105 for the 2°.

750, 1000, 1200, 1500, 1800, and 2100 m/min are the speeds.

5 lamps are used in the wet on dry process and 3 lamps are used in the wet on wet process.

(2) 600 W/in² D Fusion UV lamps are used at 100% for the 10 coatings.

(3) 600 W/in² D Fusion UV lamps are used at 100% for the 20 coatings.

Temperatures for the two coatings are 30° C. The dies are also set to 30° C.

Carbon dioxide level is 7 liters/min at each die.

Nitrogen level is 20 liters/min at each lamp.

Pressure for the 1° coating is 1 bar at 25 m/min and goes up to 3 bar at 1000 m/min.

Pressure for the 20 coating is 1 bar at 25 m/min and goes up to 4 bar at 1000 n/min.

The cured Secondary Coating on the wire is tested for initial % RAU, initial in-situ modulus and initial Tube Tg. The coated wire is then aged for one month at 85° C. and 85% relative humidity. The cured Secondary Coating on the wire is then tested for % RAU, in-situ modulus and Tube Tg.

The cured radiation curable Secondary Coating on wire is found to have the following properties:

| Line Speed (m/min) | % RAU Secondary (Initial) | % RAU Secondary (1 month) |
| --- | --- | --- |
| 750 | 90-94 | 94-98 |
| 1200 | 86-90 | 91-95 |
| 1500 | 82-86 | 90-94 |
| 1800 | 83-87 | 89-93 |
| 2100 | 80-84 | 89-93 |

| Line Speed (m/min) | In-situ Modulus Secondary (GPa) | In-situ Modulus Secondary (GPa) (1 month) |
| --- | --- | --- |
| 750 | 1.30-1.70 | 1.40-1.90 |
| 1200 | 1.00-1.40 | 1.50-1.70 |
| 1500 | 1.00-1.40 | 1.30-1.70 |
| 1800 | 1.00-1.40 | 1.10-1.50 |
| 2100 | 0.60-1.00 | 1.00-1.40 |

| Line Speed (m/min) | Secondary Tube Tg values (° C.) (initial) | Secondary Tube Tg values (° C.) (1 month) |
| --- | --- | --- |
| 750 | 68-80 | 68-80 |
| 1200 | 65-69 | 67-71 |

| Line Speed (m/min) | Secondary Tube Tg values (° C.) (initial) | Secondary Tube Tg values (° C.) (1 month) |
|---|---|---|
| 1500 | 60-64 | 61-65 |
| 1800 | 61-65 | 61-65 |
| 2100 | 50-58 | 55-59 |

Therefore it is possible to describe and claim a wire coated with a first and second layer, wherein the first layer is a cured radiation curable Primary Coating that is in contact with the outer surface of the wire and the second layer is a cured radiation curable Secondary Coating of the instant claimed invention in contact with the outer surface of the Primary Coating, wherein the cured Secondary Coating on the wire has the following properties after initial cure and after one month aging at 85° C. and 85% relative humidity:

A) a % RAU of from about 80% to about 98%;
B) an in-situ modulus of between about 0.60 GPa and about 1.90 GPa; and
C) a Tube Tg, of from about 50° C. to about 80° C.

Using this information it is also possible to describe and claim an optical fiber coated with a first and second layer, wherein the first layer is a cured radiation curable Primary Coating that is in contact with the outer surface of the optical fiber and the second layer is a cured radiation curable Secondary Coating of the instant claimed invention in contact with the outer surface of the Primary Coating, wherein the cured Secondary Coating on the optical fiber has the following properties after initial cure and after one month aging at 85° C. and 85% relative humidity:

A) a % RAU of from about 80% to about 98%:
B) an in-situ modulus of between about 0.60 GPa and about 1.90 GPa; and
C) a Tube Tg, of from about 50° C. to about 80° C.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A radiation curable secondary coating composition comprising a secondary coating oligomer blend;

wherein said secondary coating oligomer blend comprises alpha oligomer, a beta oligomer, and a gamma oligomer;

wherein said alpha oligomer is urethane free, has an acid value of about 5 mg KOH/g or less; has a number average molecular weight of about 500 g/mol or more and equal to or less than about 2,000 g/mol;

and is prepared by reaction comprising:

an acrylate compound selected from an alcohol containing acrylate or alcohol containing methacrylate compound,
an anhydride compound,
an epoxy containing compound,
an extender compound, and
an alpha oligomer catalyst selected from the group consisting of triarylphosphine catalyst, phosphonium salt, tertiary amine and metal catalyst;

wherein said beta oligomer is different from said alpha oligomer;

wherein said beta oligomer has a number average molecular weight in the range of from about 3,000 g/mol to about 10,000 g/mol, and is prepared by reaction comprising:

hydroxyethyl acrylate,
one or more diisocyanates,
a polyol selected from the group consisting of polyester polyols and polyether polyols, said polyol having a number average molecular weight in the range of from 300 g/mol to 10,000 g/mol, and
a beta oligomer catalyst selected from the group consisting of dibutyl in dilaurate, metal carboxylate, sulfonic acid, amino base catalyst, organo base catalyst, triphenyl phosphine, alkoxide of zirconium, alkoxide of titanium, and ionic liquid phosphonium salt, ionic liquid imidazolium salt, and ionic liquid pyridinium salt;

wherein said gamma oligomer is an epoxy diacrylate;

wherein the total amount of the alpha oligomer and the beta oligomer included in the radiation curable secondary coating composition is from about 30 to about 95 wt. % based on the total weight of the composition, and wherein the beta oligomer is present in the composition in an amount of from about 0.1 to about 30 wt. % of the total amount of the alpha oligomer and the beta oligomer present in the composition;

wherein said radiation curable composition when applied and cured as a secondary coating on an optical fiber has:

A) a toughness of greater than about 12 J/m3, a secant modulus of less than about 1500 MPa, and a Tg greater than about 50° C.;
B) an elongation of from about 30% to about 80%;
C) a change in equilibrium modulus of about 20% or less when aged for 60 days at 85° C. and 85% relative humidity;
D) an oil sensitivity of about 10% or less and
E) a water sensitivity of about 10% or less.

* * * * *

UNITED STATES PATENT AND TRADEMARK OFFICE
CERTIFICATE OF CORRECTION

PATENT NO. : 8,734,945 B2
APPLICATION NO. : 13/868017
DATED : May 27, 2014
INVENTOR(S) : Cattron et al.

Page 1 of 1

It is certified that error appears in the above-identified patent and that said Letters Patent is hereby corrected as shown below:

IN THE CLAIMS:

Claim 1, column 40, line 41, change in to -- tin --.

Claim 1, column 40, line 56, change 12 Jm3. to -- 12 J/m$^3$ --.

Signed and Sealed this
Fifth Day of August, 2014

Michelle K. Lee
*Deputy Director of the United States Patent and Trademark Office*